(12) United States Patent
Young

(10) Patent No.: US 7,856,154 B2
(45) Date of Patent: Dec. 21, 2010

(54) SYSTEM AND METHOD OF SUPER-RESOLUTION IMAGING FROM A SEQUENCE OF TRANSLATED AND ROTATED LOW-RESOLUTION IMAGES

(75) Inventor: Shiqiong Susan Young, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/576,132

(22) Filed: Oct. 8, 2009

(65) Prior Publication Data

US 2010/0067822 A1    Mar. 18, 2010

Related U.S. Application Data

(63) Continuation-in-part of application No. 11/038,401, filed on Jan. 19, 2005, now Pat. No. 7,602,997.

(51) Int. Cl.
*G06K 9/32* (2006.01)

(52) U.S. Cl. ........................................ 382/299; 382/280

(58) Field of Classification Search ................ 382/280, 382/299, 321
See application file for complete search history.

(56) References Cited

U.S. PATENT DOCUMENTS

| | | | |
|---|---|---|---|
| 5,767,987 | A | 6/1998 | Wolff |
| 6,023,535 | A | 2/2000 | Aoki |
| 6,157,732 | A | 12/2000 | Drisko et al. |
| 6,208,765 | B1 | 3/2001 | Bergen |
| 6,285,804 | B1 | 9/2001 | Crinon et al. |
| 6,344,893 | B1 | 2/2002 | Mendlovic et al. |
| 6,349,154 | B1 | 2/2002 | Kleihorst |
| 6,424,749 | B1 | 7/2002 | Zhu et al. |
| 6,483,952 | B2 | 11/2002 | Gregory et al. |
| 6,628,845 | B1 | 9/2003 | Stone et al. |
| 6,642,497 | B1 | 11/2003 | Apostolopoulos et al. |
| 6,650,704 | B1 | 11/2003 | Carlson et al. |

(Continued)

OTHER PUBLICATIONS

J. R. Casas and L. Torres, "Morphological filter for lossless image subsampling," Proc. Int. Conf. Image Process. ICIP-94 2, 903-907 (1994).

(Continued)

*Primary Examiner*—Aaron W Carter
(74) *Attorney, Agent, or Firm*—Lawrence E. Anderson

(57) ABSTRACT

A method and system for super-resolving images from low-resolution sequences comprising an image processor having an input for inputting multiple images of a scene with sub-pixel translations and rotations; one of the images of the scene being a reference image; and at least one memory comprising a gross translation estimation algorithm for estimating overall translations of at least one image with respect to the reference image on the image processor and aligning the inputted images according to the gross translation estimates on the image processor; a sub-pixel estimation algorithm for obtaining the sub-pixel shift and rotation of each image with respect to the reference image; and an error reduction algorithm for applying at least one spatial frequency domain constraint and at least one spatial domain constraint to the images to produce a high-resolution image.

19 Claims, 17 Drawing Sheets

U.S. PATENT DOCUMENTS

| | | |
|---|---|---|
| 7,106,914 B2 | 9/2006 | Tipping et al. |
| 7,323,681 B1 | 1/2008 | Oldham et al. |
| 2004/0239885 A1 | 12/2004 | Jaynes et al. |
| 2006/0053455 A1 | 3/2006 | Mani et al. |
| 2006/0279585 A1 | 12/2006 | Milanfar et al. |
| 2007/0130095 A1 | 6/2007 | Peot et al. |
| 2007/0196009 A1 | 8/2007 | Deinzer |
| 2007/0206678 A1 | 9/2007 | Kondo |

OTHER PUBLICATIONS

A. S. Fruchter, et al., "Drizzle: a Method for the Linear Reconstruction of Undersampled Images," Publications of the Astronomical Society of the Pacific, vol. 114, pp. 144-152, Feb. 2002.

J. O. Kim, B. T. Choi, A. Morales, and S. J. Ko, "Neural concurrent subsampling and interpolation for images," Proc. IEEE 2, 1327-1330 (1999).

L. G. Brown, "A survey of image registration techniques," ACM Computing Survey, vol. 24, No. 4, Dec. 1992, pp. 325-376.

S. S. Young, "Alias-free image subsampling using Fourier-based windowing methods," Optical Engineering, vol. 43, No. 4, Apr. 2004, pp. 843-855.

R.Y. Tsai and T.S. Huang, "Mulitple Frame Image Restoration and Registration," Advances in Computer Vision and Image Processing, Greenwich CT: JAI Press, Inc. 1984, pp. 317-339.

B.C. Tom and A.K. Katsaggelos, "Reconstruction of a High-resolution Image by Simultaneous Registration, Restoration, and Interpolation of Low-resolution Images," Proceedings of 1995 IEEE Int. Conf. Image Processing, col. 2, Washington, DC, Oct. 1995, pp. 539-542.

R.R. Schulz and R. L. Stevenson, "Extraction of high-resolution frames from video sequences," IEEE Trans. Image Processing, vol. 5, pp. 996-1011, Jun. 1996.

A. M. Guarnieri, C. Prati, and F. Rocca, "SAR interferometric quick-look," Proc. Geosci. Remote Sens. Symp. IGARSS '93 3, 988-990 (1993).

J. O. Kim, B. T. Choi, A Morales, and S. J. Ko, "Neural concurrent subsampling and interpolation for images," Proc. IEEE 2, 1327-1330 (1999).

M. Irani and S. Peleg, "Improving Resolution by Image Registration," CVGIP: Graphical Models and Image Processing, vol. 53, pp. 231-239, May 1991.

R. C. Hardie, K.J. Barnard, and E. E. Armstrong, "Joint MAP registration and high-resolution image estimation using a sequence of undersampled images," IEEE Trans. Image Processing, vol. 6, pp. 1621-1633, Dec. 1997.

A. Papoulis, Chapter 14, Probability Random Variables, and Stochastic Processes, McGraw-Hill Book Company Inc., New York, 1984.

H. Stark and P. Oskoui, "High-resolution image recovery from image-plane arrays, using convex projections," J. Opt. Soc. Am. A, vol. 6, No. 11, pp. 1715-1726, Nov. 1989.

S. Foucher, G. B. Benie, and J. M. Boucher, "Multiscale MAP filtering of SAR images," IEEE Trans. Image Process. 10 (1), 49-60 (Jan. 2001).

B. J. Geiman, L. N. Bohs, M. E. Anderson, S. M. Breit, and G. E. Trahey, "A novel interpolation startegy for estimating subsample speckle motion," Phys. Med. Biol. 45(6), 1541-1552 (Jun. 2000).

R. Leptoukh, S. Ahmad, P. Eaton, M. Hegde, S. Kempler, J. Koziana, D. Ostrenga, D. Ouzounov, A. Savtchenko, G. Serafina, A. K. Sharma, and B. Zhou, "GES DAAC tools for accessing and visualizing MODIS data," Proc. Geosci. Remote Sens. Symp. IGARSS '02 6, 3202-3204 (2002).

B. E. Schmitz and R. L. Stevenson, "The enhancement of images containing subsampled chrominance information," IEEE Trans. Image Process. 6(7), 1052-1056 (1997).

A. Dumitras and F. Kossentini, "High-order image subsampling using feedforward artificial neural networks," IEEE Trans. Image Process. 10(3), 427-435 (2001).

A. Landmark, N. Wadstromer, and H. Li, "Hierarchical subsampling giving fractal regions," IEEE Trans. Image Process. 10(1), 167-173 (2001).

R. A. F. Belfor, M. P. A. Hesp, R. L. Lagendijk, and J. Biemond, "Spatially adaptive subsampling of image sequences," IEEE Trans. Image Process. 3(5), 492-500 (1994).

Gerchberg, "Super Resolution Through Error Energy Reduction," OPTICA ACTS, vol. 21, No. 9, pp. 709-720 (1974).

IB.C. Tom and A.K. Katsaggelos, "Reconstruction of a High-resolution Image by Simultaneous Registration, Restoration, and Interpolation of Low-resolution Images," Proceedings of 1995 IEEE Int. Conf. Image Processing, col. 2, Washington, DC, Oct. 1995, pp. 539-542.

R. .R. Schulz and R. L. Stevenson, "Extraction of high-resolution frames from video sequences," IEEE Trans. Image Processing, vol. 5, pp. 996-1011, Jun. 1996.

A. M. Guamieri, C. Prati, and F. Rocca, "SAR interferometric quick-look," Proc. Geosci. Remote Sens. Symp. IGARSS '93 3, 988-990 (1993).

A. S. Fruchter, et al., "Drizzle: a Method for the Linear Reconstruction of Undersampled Images," Publications of the Astronomical Society of the Pacific, vol. 114, pp. 144-152, Feb. 2002 [arXiv:astro-ph/9808087v2 Oct. 19, 2001].

Rosenfeld, et al., "Digital Picture Processing," Second Edition, vol. 2, pp. 36-39 (1982).

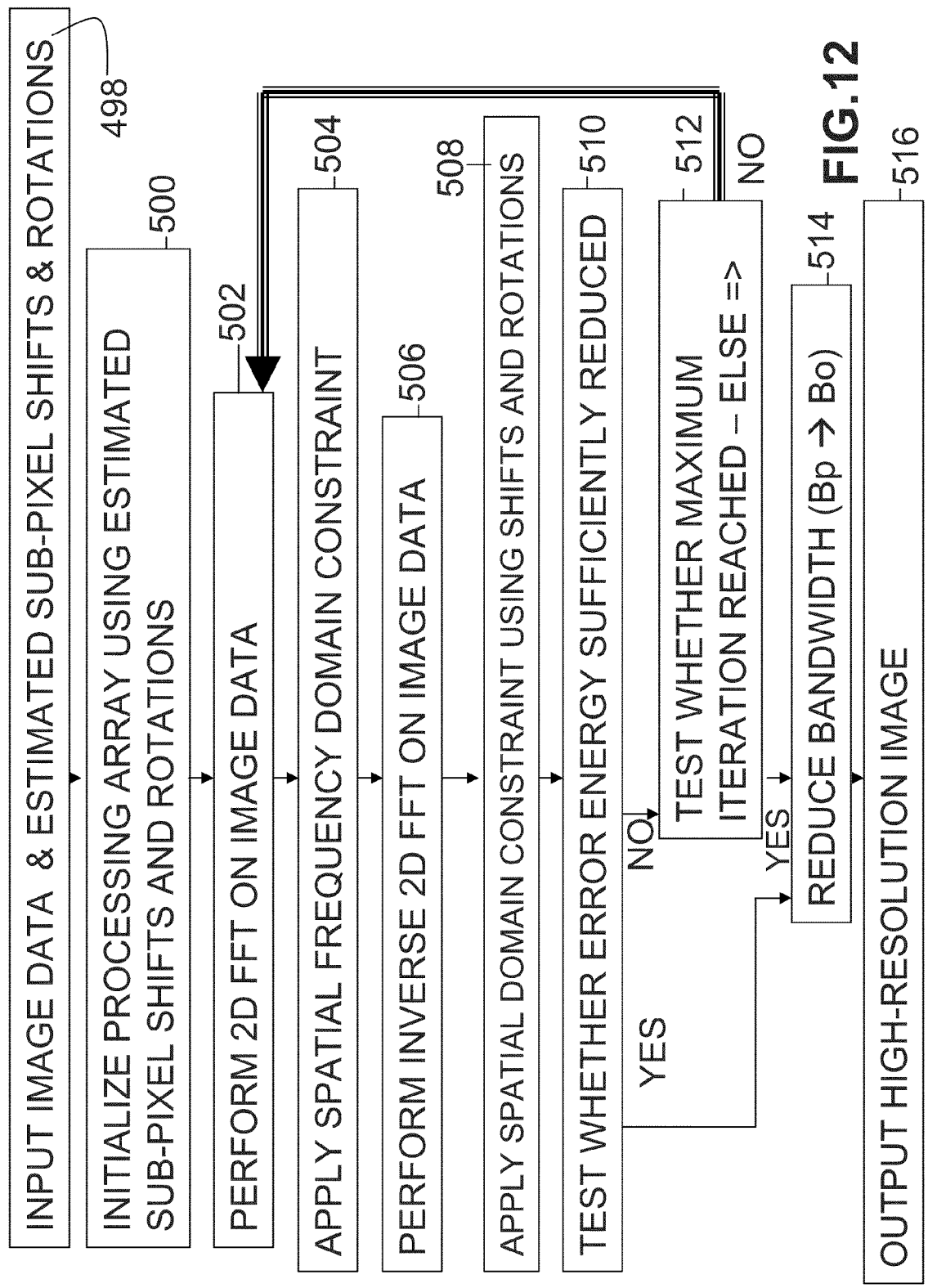

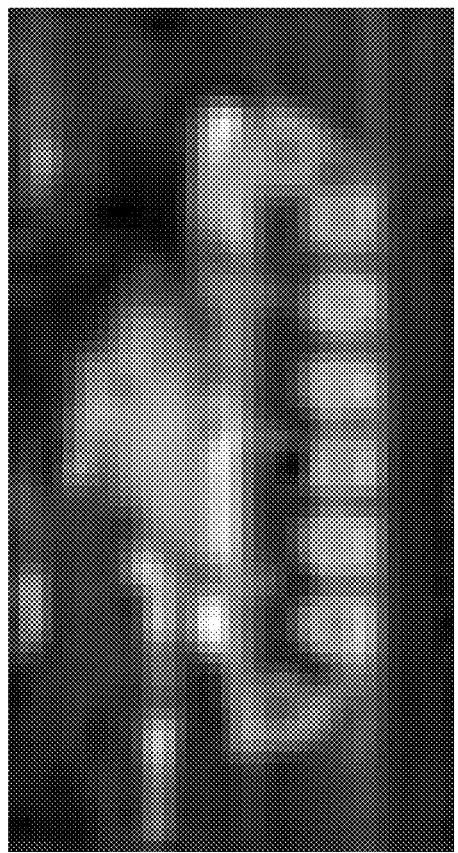
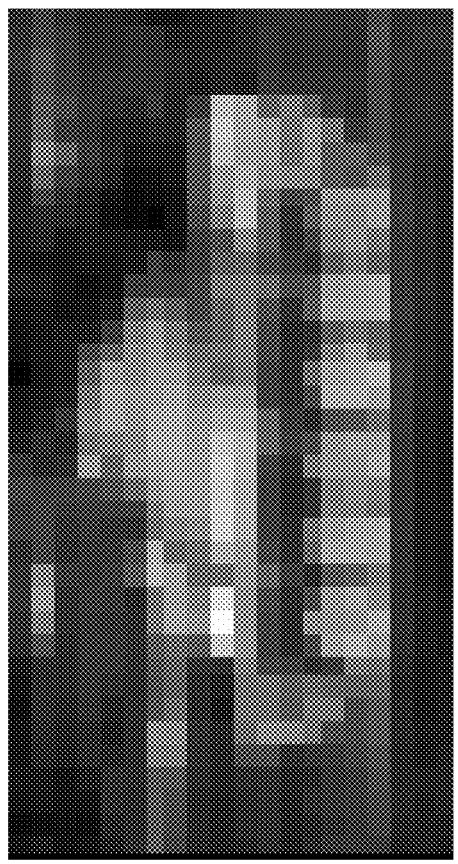
FIG. 13B
FIG. 13A

SYSTEM AND METHOD OF SUPER-RESOLUTION IMAGING FROM A SEQUENCE OF TRANSLATED AND ROTATED LOW-RESOLUTION IMAGES

CROSS REFERENCE TO RELATED APPLICATIONS

This application is a Continuation-In-Part of U.S. patent application Ser. No. 11/038,401, filed Jan. 19, 2005, entitled METHOD FOR SUPER-RESOLVING IMAGES, to which priority is being claimed under 35 U.S.C. §120 and hereby incorporated by reference.

GOVERNMENT INTEREST

The invention described herein may be manufactured, used, and/or licensed by or for the United States Government.

FIELD OF THE INVENTION

This invention relates in general to a method of digital image processing, and more specifically relates to super-resolution image reconstruction.

BACKGROUND OF THE INVENTION

Many low-cost sensors (or cameras) may spatially or electronically undersample an image. Similarly, cameras taking pictures from great distances, such as aerial photos, may not obtain detailed information about the subject matter. This may result in aliased images in which the high frequency components are folded into the low frequency components in the image. Consequently, subtle or detail information (high frequency components) are not present in the images. Super-resolution image reconstruction generally increases image resolution without necessitating a change in the design of the optics and/or detectors by using a sequence (or a few snapshots) of low-resolution images. Super-resolution image reconstruction algorithms effectively de-alias undersampled images to obtain a substantially alias-free or, as identified in the literature, a super-resolved image.

When undersampled images have sub-pixel translations and rotations between successive frames, they contain different information regarding the same scene. Super-resolution image reconstruction involves, inter alia, combining information contained in undersampled images to obtain an alias-free (high-resolution) image. Super-resolution image reconstruction from multiple snapshots, taken by a detector which has shifted and/or rotated in position, provides far more detail information than any interpolated image from a single snapshot.

Generally, super-resolution image reconstruction involves acquiring a sequence of images from the same scene with sub-pixel translations and rotations among the images. The methods for acquiring low-resolution images with sub-pixel translations and rotations include acquiring images affected by translation and/or rotation.

One of these methods is to have controlled sub-pixel translations and rotations in which each image is captured by linearly displacing the sensor a known fraction pixel displacement, as for example in U.S. Pat. No. 6,344,893, "Super-resolving imaging system," Feb. 5, 2002, D. Mendlovic et. al.; and U.S. Pat. No. 6,483,952, "Super resolution methods for electro-optical systems," Nov. 19, 2002, D. D. Gregory, et. al. Or the super-resolution image reconstruction may involve images acquired by rotating an image array about the optical axis as, for example, in U.S. Pat. No. 6,642,497, "System for improving image resolution via sensor rotation," Nov. 4, 2003, J. Apostolopoulos, et al. Generally, the acquired images in super-resolution image reconstruction contain sub-pixel translations and/or rotations.

Methods for super-resolving images that contain sub-pixel translations and/or rotations are in the following references.

U.S. Pat. No. 7,323,681, to Oldham, et. al., "Image enhancement by sub-pixel imaging," issued Jan. 29, 2008, teaches a method of using a linear reconstruction approach as described in A. S. Fruchter, et al., "Drizzle: a Method for the Linear Reconstruction of Undersampled Images," Publications of the Astronomical Society of the Pacific, vol. 114, pp. 144-152, February 2002. In this method, the target's orientation relative to the detector may be rotated and/or translated so as to yield a generalized mapping between a pixel space of the low-resolution image and a relatively smaller pixel space of the high-resolution image. The sub-pixel's output, representing high-resolution image pixel values, may be achieved by summing the contributions of image values of the overlapping pixels from a number of low-resolution images. In order to improve sub-pixel output approximation, the mapping includes a surface intensity term which compensates for the small overlapping of pixels due to rotation.

U.S. Pat. No. 7,106,914, "Bayesian image super resolution," Sep. 12, 2006, M. E. Tipping, et. al. and U.S. Patent Application Publication US2007/0130095, "Bayesian approach for sensor super-resolution," Jun. 7, 2007, M. A Peot and M Aguilar disclose a statistical Bayesian inverse processing method in which an observation model is formulated to relate the original high-resolution image to the observed low-resolution images. Parameters including rotation and translation are obtained by optimizing a marginal likelihood of low-resolution images in which the marginal likelihood is a function of the alignment and rotation parameters. Then, the full high-resolution image is derived in an inference operation using these parameters.

U.S. Patent Application Publication US2007/0196009, "Method for operating an X-ray diagnostic device for the generation of high-resolution images," Aug. 23, 2007, to Deinzer discloses a method involving translations and rotations among low-resolution X-ray images that are determined by a minimization approach. The high-resolution X-ray image is obtained by performing bilinear interpolation approach.

There is a need to produce high-resolution images from a sequence of low-resolution images captured by a low-cost imaging device that has experienced translations and/or rotations. The amount of sub-pixel translation and/or rotation may be unknown and it creates a need to estimate sub-pixel translation and rotation. In order to produce high-resolution images from a sequence of translated and rotated undersampled (low-resolution) images, there exists a need to eliminate aliasing, while taking into account natural jitter.

SUMMARY OF THE INVENTION

The present invention provides a method and system for the super-resolving images reconstructed from sequences of lower resolution, aliased imagery affected by translations and rotations of the detector (e.g., camera) during image capture.

The present invention utilizes a sequence of undersampled low-resolution images from the same scene with sub-pixel translations and rotations among the images to reconstruct an alias-free high-resolution image, or to produce a sequence of such alias-free high-resolution frames as in a video sequence. The undersampled low resolution images may be captured in the presence of natural jitter or some kind of controlled motion of the camera. For example, the natural jitter may be the result of a vehicle traveling down a bumpy road or an aircraft experiencing turbulence. The present invention is adaptable to situations where prior knowledge about the high-resolution image is unknown, as well when unknown, irregular or uncontrolled sub-pixel translations and rotations have occurred among the low-resolution images.

As depicted in FIG. 1, a sequence of original input low resolution images is passed into a translation and rotation parameter estimation algorithm (Box 100) that includes a gross shift estimation algorithm (Box 110) from which an estimate of the overall shift of each frame with respect to a reference frame is obtained, and a sub-pixel translation and rotation estimation algorithm (Box 120). Input images on successive frames contain not only sub-pixel shifts but also the integer pixel shifts. Since the common center area of the images contributes most to the rotation angle estimation, the gross shifts (integer pixel shifts) among frames are estimated and compensated for, and the input images are realigned. The sub-pixel translations and rotations are then estimated for each frame with respect to a reference frame (Box 120). An error reduction algorithm is applied (Box 140) to the input low resolution images with the estimated sub-pixel shifts and rotations among images to obtain the high-resolution (alias-free) output.

According to a preferred embodiment of the present invention, there is provided a method of super-resolving images from low-resolution sequences affected by translations and rotations comprising the steps of inputting multiple under-sampled low-resolution input images of the same scene with sub-pixel translations and rotations among images into an image processor; obtaining the gross translation for each image with respect to a reference image on the image processor; aligning the inputted images according to the gross translation estimates on the image processor; applying a sub-pixel translation and rotation estimation algorithm on the image processor to the aligned undersampled input images to obtain the sub-pixel shift and rotation of each image with respect to a reference image (FIG. 1, Box 120); and applying an error reduction algorithm (FIG. 1, Box 140) for translated and rotated undersampled input low-resolution images with the estimated sub-pixel shifts and rotations among images to produce a high-resolution (alias-free) output image from the image processor.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 12 is a schematic representation of a sequence of steps representing, inter alia, an error-energy reduction algorithm for input image sequences influenced or affected by both translations and rotations.

FIG. 13a displays one of low-resolution images shown in FIG. 8.

FIG. 13b illustrates a super-resolved image reconstructed from 6 low-resolution images with shifts and rotations among them as shown in FIG. 8.

DETAILED DESCRIPTION OF THE PREFERRED EMBODIMENTS

Figure 1:
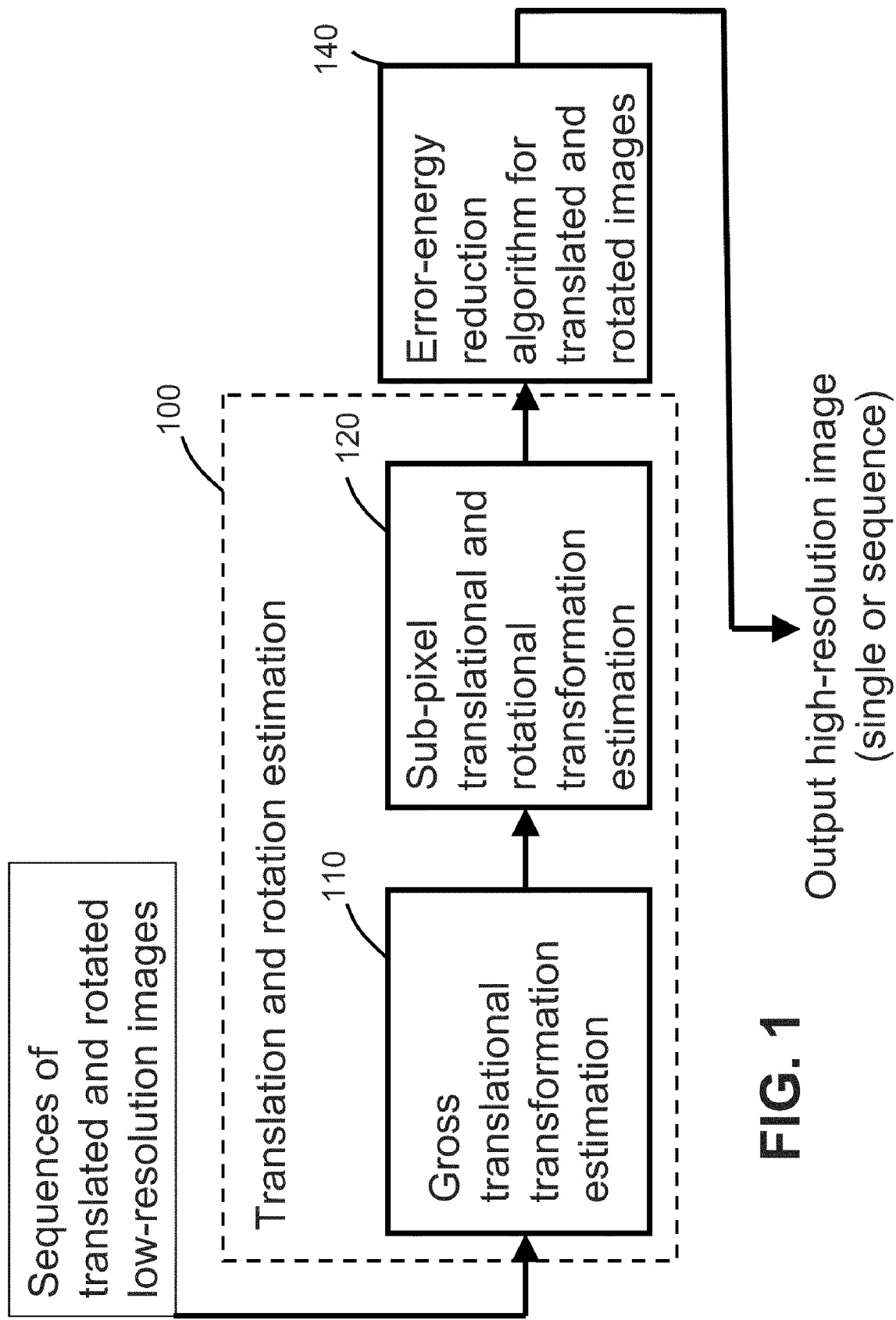
FIG. 1 is an overall schematic representation of an embodiment of the present invention for reconstructing super-resolved images from low-resolution sequences whose frames are effectuated or impacted by translation and/or rotation.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an overall schematic representation of a preferred embodiment of the present invention. A sequence of original input low resolution images is passed into a translation and rotation estimation algorithm (Box 100) that includes a gross translation estimation algorithm (Box 110) from which an estimate of the overall shift of each frame with respect to a reference frame is obtained, and a sub-pixels translation and rotation estimation algorithm (Box 120). Input images on successive frames contain not only sub-pixel shifts but also the integer pixel shifts. Since the common center area of the images contributes most to the rotation angle estimation, the gross shifts (integer pixel shifts) among frames are estimated and compensated for, and the input images are realigned.

The method of acquiring a sequence of images in super-resolution image reconstruction in this embodiment may involve non-controlled sub-pixel translations and rotations; e.g. natural jitter. This can be more cost effective and more practical than the controlled sub-pixel translation and rotation image acquisition. In many applications, the imager may be carried by a moving platform or the object itself may be moving. In military reconnaissance situations, the moving platform may be a person, an unmanned ground vehicle (UGV), or an unmanned aerial vehicle (UAV) flying in a circular motion. As a result, acquired images may contain sub-pixel translations and/or rotations. During the process of super-resolution image reconstruction, after multiple sub-pixel translated and/or rotated images are obtained, they are then combined to reconstruct the high-resolution image by projecting low-resolution images onto a high-resolution grid, which is of a finer sampled grid than the lower resolution grid. The sub-pixel translations and rotations found in images resulting from natural jitter pose a need for accurate estimation.

In Box 120 of FIG. 1 the sub-pixel translation and rotation are estimated for each frame with respect to a reference frame. In Box 140 of FIG. 1, an error-energy reduction algorithm for translated and rotated images is applied to the input images with the estimated sub-pixel shifts and rotations among images to obtain the high-resolution (alias-free) output image. The output may be either a single high-resolution image that is generated from a sequence of low-resolution images or a sequence of high-resolution images that are generated from multiple sequences of low-resolution images.

Translation and Rotation Estimation

Figure 2:
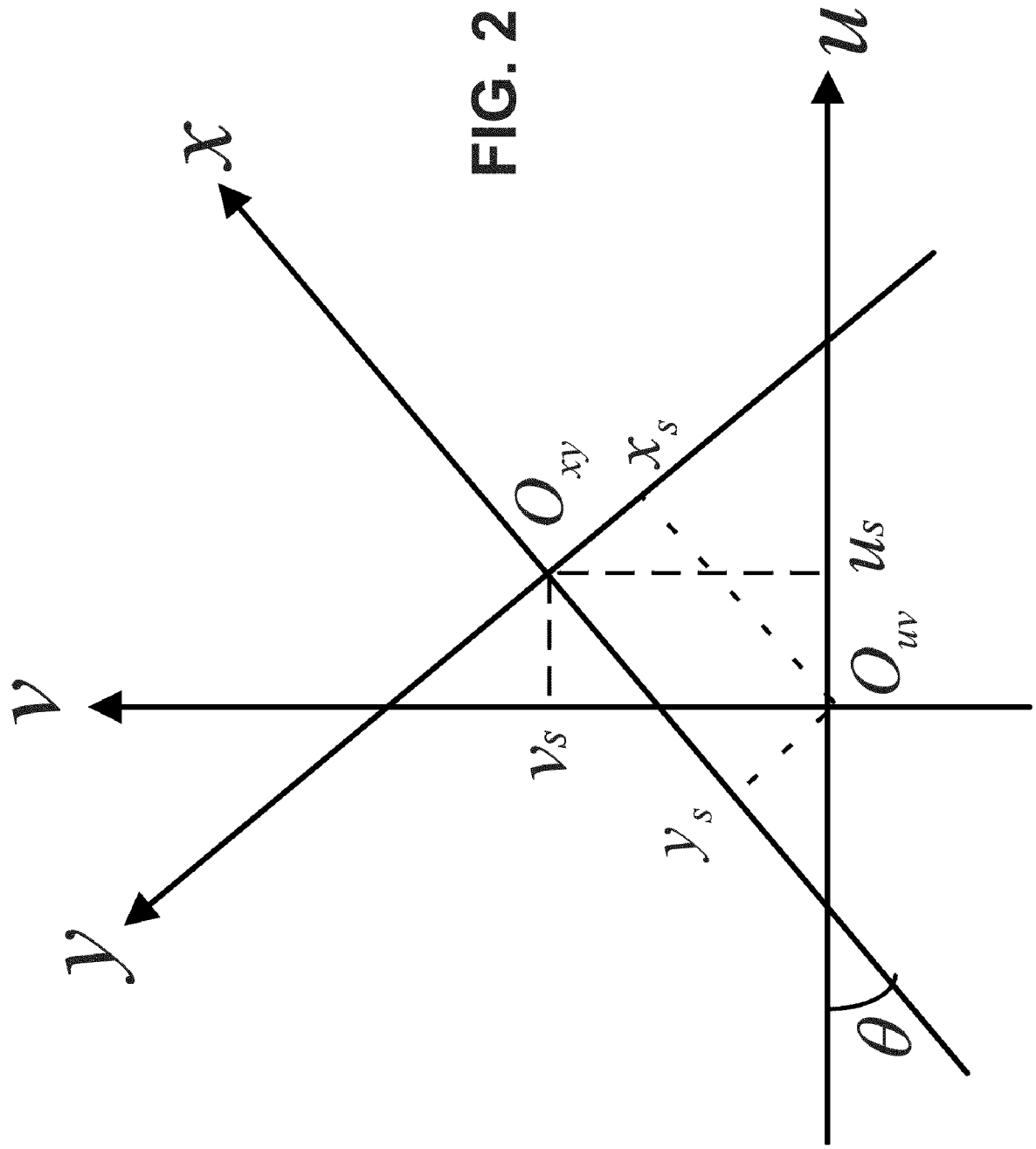
FIG. 2 illustrates a graphic view showing the relationship between two coordinate planes, (u,v) with the origin at $o_{uv}$, and (x,y) with the origin at $o_{xy}$; $\theta$ is the rotation angle, $(x_s,y_s)$ the relative shifts in (x,y) coordinates when u=0 and v=0, $(u_s,v_s)$ the relative shifts in (u,v) coordinates when x=0 and y=0.

Two image frames of a low-resolution image sequence may be designated $f_1(x,y)$ and $f_2(u,v)$. Because of the conditions under which the frames are acquired, the second image is a shifted and/or rotated version of the first image, that is, $$f_2(u, v) = f_1(x, y) \quad \text{Equation (1)}$$

$$\begin{bmatrix} u \\ v \end{bmatrix} = \begin{bmatrix} \cos\theta & \sin\theta \\ -\sin\theta & \cos\theta \end{bmatrix} \begin{bmatrix} x - x_s \\ y - y_s \end{bmatrix} \quad \text{Equation (2)}$$

or $$\begin{bmatrix} u \\ v \end{bmatrix} = \begin{bmatrix} \cos\theta & \sin\theta \\ -\sin\theta & \cos\theta \end{bmatrix} \begin{bmatrix} x \\ y \end{bmatrix} + \begin{bmatrix} u_s \\ v_s \end{bmatrix} \quad \text{Equation (3)}$$

where (x,y) represent the coordinate plane in the first image, and (u,v) represent the coordinate plane in the shifted and rotated second image, as shown in FIG. 2; $\theta$ is the rotation angle and $(x_s, y_s)$ the relative shifts between $f_1(x,y)$ and $f_2(u,v)$ in (x,y) plane (where u=0 and v=0) and $(u_s, v_s)$ the relative shifts in (u,v) plane (where x=0 and y=0) (as shown in FIG. 2). The relation between $(x_s, y_s)$ and $(u_s, v_s)$ can be written as:

$$\begin{bmatrix} u_s \\ v_s \end{bmatrix} = \begin{bmatrix} \cos\theta & \sin\theta \\ -\sin\theta & \cos\theta \end{bmatrix} \begin{bmatrix} -x_s \\ -y_s \end{bmatrix} \quad \text{Equation (4)}$$

If the relative shifts $(u_s, v_s)$ are obtained, the shifts $(x_s, y_s)$ can be obtained. Hereinafter, both $(x_s, y_s)$ and $(u_s, v_s)$ may be used for the relative shifts. The transformation parameters between images including translation (shift) $(x_s, y_s)$ and rotation $\theta$ are estimated using a signal registration method and properties of Fourier transform.

Signal Registration—The signal registration method is described in the following. Almost all of the transformation parameter estimation methods are based on the signal registration method. It is assumed that the signals to be matched differ only by an unknown translation. In practice, beside translation, there may be rotation, noise, and geometrical distortions. Nevertheless, the signal registration description offers a fundamental solution to the problem. The procedure for pixel-level registration is to first calculate the correlation between two images $f_1(x,y)$ and $f_2(x,y)$ as:

$$r(k, l) = \sum_{n=1}^{N} \sum_{m=1}^{M} R[f_1(n+k-1, m+l-1), f_2(n, m)] \quad \text{Equation (5)}$$

where $1 \leq k \leq N$, $1 \leq l \leq M$ and R is a similarity measure, such as a normalized cross-correlation or an absolute difference function. For the (N−1, M−1) samples of r(k,l), there is a maximum value of $r(x_s, y_s)$, where $(x_s, y_s)$ is the displacement in sampling intervals of $f_2(x,y)$ with respect to $f_1(x,y)$. Many transformation parameter estimation methods are based on the variations of the signal registration.

A signal registration based correlation method is used for translation parameter estimation between two images based on 1) the correlation theorem; and 2) the shift property of Fourier transform. This method begins with the cross-correlation between two images. The terminology "cross-correlation" or "cross correlation" as used herein is a measure of similarity of two frames in terms of a function of one of them. The two-dimensional normalized cross-correlation function measures the similarity for each translation:

$$C(k, l) = \frac{\sum_{n=1}^{N} \sum_{m=1}^{M} f_1(n, m) f_2(n+k-1, m+l-1)}{\sqrt{\sum_{n=1}^{N} \sum_{m=1}^{M} f_2^2(n+k-1, m+l-1)}} \quad \text{Equation (6)}$$

where $1 \leq k \leq N$, $1 \leq l \leq M$ and $(N, M)$ is the dimension of the image. If $f_1(x,y)$ matches $f_2(x,y)$ exactly, except for an intensity scale factor, at a translation of $(x_s, y_s)$, the cross-correlation has its peak at $C(x_s, y_s)$. Various implementations and discussions can be found for example in (1) A. Rosenfeld and A. C. Kak, *Digital Picture Processing, Vol. I and II*, Orlando, Fla.: Academic Press, 1982; (2) L. G. Brown, "A survey of image registration techniques," ACM Computing Survey, Vol. 24, No. 4, December 1992, pp. 325-376), both of which are hereby incorporated by reference.

Correlation Theorem More efficient signal registration method for translation estimation is using the correlation method in the spatial frequency domain via the Correlation Theorem. The Correlation Theorem states that the Fourier transform of the cross-correlation of two images is the product of the Fourier transform of one image and the complex conjugate of the Fourier transform of the other, that is, $$Q_{12}(k_x,k_y) = \Im[C(x,y)] = F_2(k_x,k_y) \cdot F_1^*(k_x,k_y) \qquad \text{Equation (7)}$$

where $F_1(k_x,k_y)$ and $F_2(k_x,k_y)$ are Fourier transforms of two images, $f_1(x,y)$ and $f_2(x,y)$, respectively, $F_1^*(k_x,k_y)$ is the conjugate of $F_1(k_x,k_y)$.

Fourier Transform Properties—The properties of Fourier transform are described in the following that include shift property of Fourier transform, polar transformation and polar function mapping, and rotation property of Fourier transform. A Fourier transform is an operation that transforms one complex-valued function of a real variable into a new function. In such applications as image processing, the domain of the original function is typically space and is accordingly called the spatial domain. The domain of the new function is spatial frequency, and so the Fourier transform is often called the spatial frequency domain (or Fourier domain) representation of the original function as it describes which frequencies are present in the original function. As used herein the terminology "Fourier transform" refers both to the frequency domain representation of a function and to the process or formula that "transforms" one function into the other.

Shift Property of Fourier Transform—Two members of the image sequence are denoted by $f_1(x,y)$ and $f_2(x,y)$. The second image is a shifted version of the first image, such as, $$f_2(x,y) = f_1(x - x_s, y - y_s) \qquad \text{Equation (8)}$$

where $(x_s, y_s)$ are the relative shifts (translational differences) between $f_1(x,y)$ and $f_2(x,y)$. Then, $$F_2(k_x,k_y) = F_1(k_x,k_y) \exp[j(k_x x_s + k_y y_s)] \qquad \text{Equation (9)}$$

where $F_2(k_x,k_y)$ and $F_2(k_x,k_y)$ are Fourier transforms of two images. Thus, a shift in one domain results in the addition of a linear phase function in the Fourier domain.

Polar Transform and Polar Function Mapping—The polar transformation of the domain (x,y) for a 2-D signal f(x,y) may be represented by $$f_p(\theta, r) \equiv f(x, y) \qquad \text{Equation (10)}$$

where $$\theta \equiv \arctan\left(\frac{y}{x}\right) \qquad \text{Equation (11a)}$$

and $$r \equiv \sqrt{x^2 + y^2} \qquad \text{Equation (11b)}$$

Note that $f(x,y) \neq f_p(x,y)$. This equation is called the polar function mapping off (x,y). The polar function mapping of $F(k_x,k_y)$ in the spatial frequency domain may be defined via $$F_p(\phi, \rho) = F(k_x, k_y) \qquad \text{Equation (12)}$$

where $$\phi \equiv \arctan\left(\frac{k_y}{k_x}\right) \qquad \text{Equation (13a)}$$

and $$\rho = \sqrt{k_x^2 + k_y^2} \qquad \text{Equations (13b)}$$

It is noted that $F_p(\bullet, \bullet)$ is not the Fourier transform of $f_p(\bullet, \bullet)$.

Rotation Property of Fourier Transform—Two members of the image sequence are denoted $f_1(x,y)$ and $f_2(u,v)$, the second image being a rotated version of the first image, $$f_2(u, v) = f_1(x, y) \qquad \text{Equation (1)}$$

$$\begin{bmatrix} u \\ v \end{bmatrix} = \begin{bmatrix} \cos\theta & \sin\theta \\ -\sin\theta & \cos\theta \end{bmatrix} \begin{bmatrix} x \\ y \end{bmatrix} \qquad \text{Equation (3)}$$

where $\theta$ is the relative rotation (rotational differences) between $f_1(x,y)$ and $f_2(u,v)$. Then, $$F_2(k_u, k_v) = F_1(k_x, k_y) \qquad \text{Equation (14)}$$

where $[k_u, k_v]$ and $[k_x, k_y]$ have the following relation, $$\begin{bmatrix} k_u \\ k_v \end{bmatrix} = \begin{bmatrix} \cos\theta & \sin\theta \\ -\sin\theta & \cos\theta \end{bmatrix} \begin{bmatrix} k_x \\ k_y \end{bmatrix} \qquad \text{Equation (15)}$$

Using the polar function mappings of $F_1(k_x,k_y)$ and $F_2(k_u,k_v)$, then $$F_{p2}(\phi, \rho) = F_{p1}(\phi - \theta, \rho) \qquad \text{(Equation 16)}$$

That is, if one image is a rotated version of another image, then the polar function mapping of one is the shifted version of the polar function mapping of the other one in the spatial frequency domain.

Gross Translation Estimation—

The gross translation estimation (Box 110) is described in the following. The second image can be expressed as a shifted version of the first image, such as, $$f_2(u, v) = f_1(x, y) \qquad \text{Equation (1)}$$

$$\begin{bmatrix} u \\ v \end{bmatrix} = \begin{bmatrix} x - x_s \\ y - y_s \end{bmatrix} \qquad \text{Equation (17)}$$

where $(x_s, y_s)$ are the relative shifts (translational differences) between $f_1(x,y)$ and $f_2(u,v)$. The shifts $(x_s, y_s)$ are found according to the Correlation Theorem based on the signal registration method by exploring the translational differences (shifts in x and y domains) of Fourier transforms of two images.

According to the Correlation Theorem, the Fourier transform of the cross-correlation of the two images, $f_1(x,y)$ and $f_2(x,y)$ can be found as follows:

$$Q_{12}(k_x,k_y) = \Im[C(x,y)] = F_2(k_x,k_y) \cdot F_1^*(k_x,k_y) \quad \text{Equation (7)}$$

where $F_1(k_x,k_y)$ and $F_2(k_x,k_y)$ are Fourier transforms of two images, $f_1(x,y)$ and $f_2(x,y)$, respectively, $F_1^*(k_y,k_y)$ is the conjugate of $F_1(k_x,k_y)$.

Using the shift property of Fourier transform, the Fourier transform, $F_2(k_x,k_y)$, can be substituted via $$F_2(k_x,k_y) = F_1(k_x,k_y)\exp[-j(k_x x_s + k_y y_s)] \quad \text{Equation (9)}$$

Then, the Fourier transform of the cross-correlation of the two images, $f_1(x,y)$ and $f_2(x,y)$, that is, the product of the Fourier transform of one image and the complex conjugate of the Fourier transform of the other, can then be expressed as $$Q_{12}(k_x, k_y) = F_1(k_x, k_y)F_1^*(k_x, k_y) \quad \text{Equation (18)}$$
$$\exp[-j(k_x x_s + k_y y_s)]$$
$$= |F_1(k_x, k_y)|\exp[-j(k_x x_s + k_y y_s)]$$

Then, the shifts $(x_s, y_s)$ are found as the peak of inverse Fourier transform of the cross-correlation, $Q_{12}(k_x,k_y)$.

Figure 3:
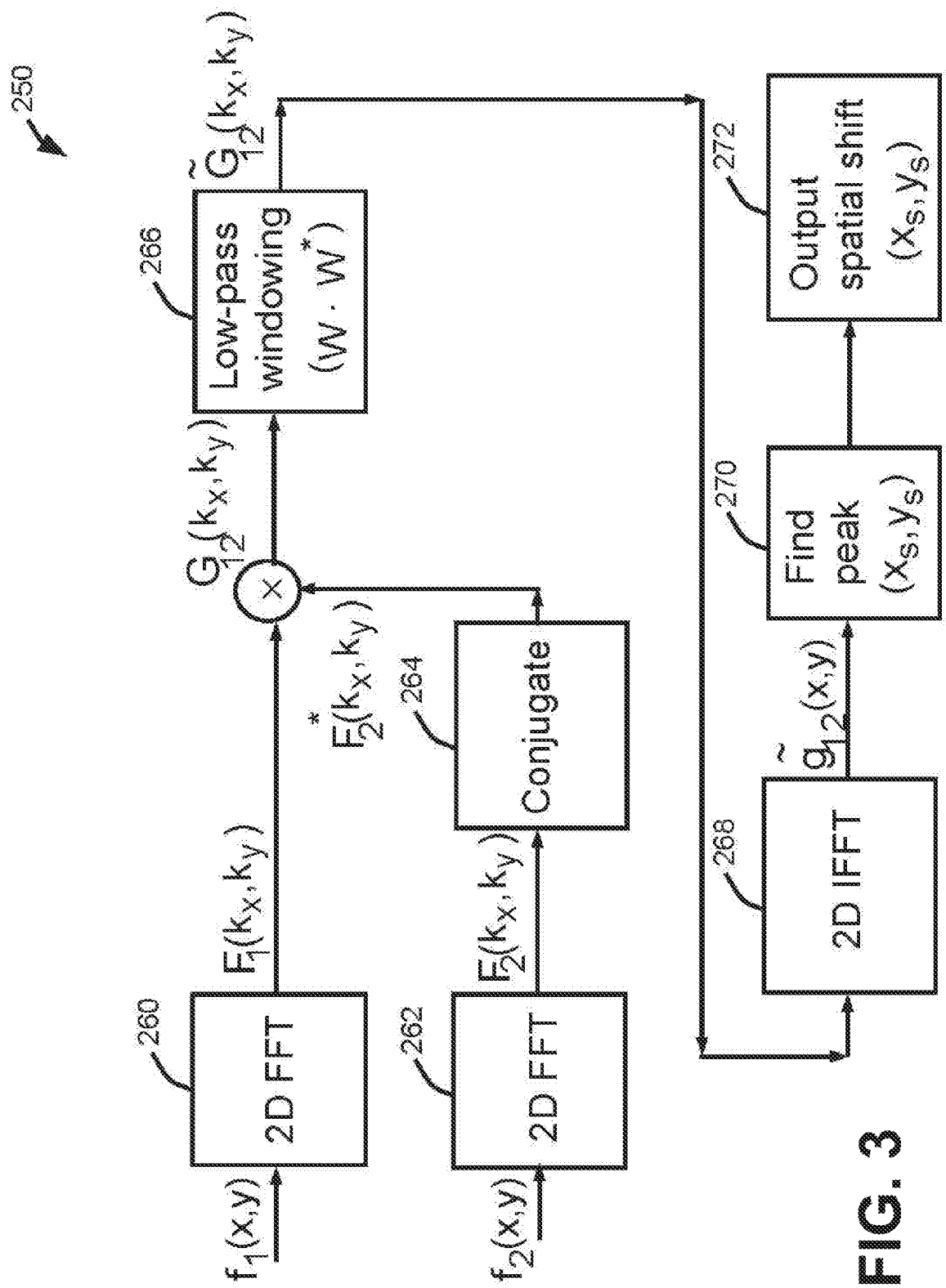
FIG. 3 is a schematic representation of a sequence of computations and/or stages of the computational efficient translation estimation algorithm for two-dimensional images.

Translation Estimation with Aliasing Consideration— Since both images $f_1(x,y)$ and $f_2(u,v)$ are aliased, i.e., the high frequency components are folded into a portion of low frequency components. In general, for an aliased image, the image energy at lower frequency components is stronger than the folded high frequency components. Thus, the signal to aliasing power ratio is relatively high around $(k_x,k_y) \approx (0,0)$. Therefore, a low-pass filtering, W, is applied to the Fourier transforms $F_1(k_x,k_y)$ and $F_2(k_x,k_y)$. A schematic diagram of the computational efficient translation estimation method as described in U.S. patent application Ser. No. 11/038,401, "Method of Super-Resolving Images," filed Jan. 19, 2005, S. S. Young, hereby incorporated by reference, is shown in FIG. 3.

Since the Fourier transform can be computed efficiently with existing, well-tested programs of FFT (fast Fourier transform) (and occasionally in hardware using specialized optics), the use of the FFT becomes most beneficial for cases where the images to be tested are large as described in L. G. Brown, "A survey of image registration techniques," ACM Computing Survey, Vol. 24, No. 4, December 1992, pp. 325-376.

Sub-Pixel Translation Estimation

Translation Estimation with Sub-pixel Accuracy and Aliasing Consideration—The sub-pixel translation estimation (Box 120) is described in the following. In super-resolution image reconstruction of a preferred embodiment, sub-pixel shifts (or fractional pixel displacements) among the input images are estimated using a method to estimate or calculate frame-to-frame motion within sub-pixel accuracy. In general, the smallest motion that can be obtained from conventional motion estimation is one pixel. Obtaining sub-pixel motion accurately is not straightforward. A method to achieve the sub-pixel accuracy solution has been described in the aforementioned U.S. patent application Ser. No. 11/038,401, "Method of Super-Resolving Images." This method is based on resampling via frequency domain interpolation by using a Fourier windowing method as described in S. S. Young, "Alias-free image subsampling using Fourier-based windowing methods," Optical Engineering, Vol. 43, No. 4, April 2004, pp. 843-855 (hereby incorporated by reference), called power window.

Figure 4:
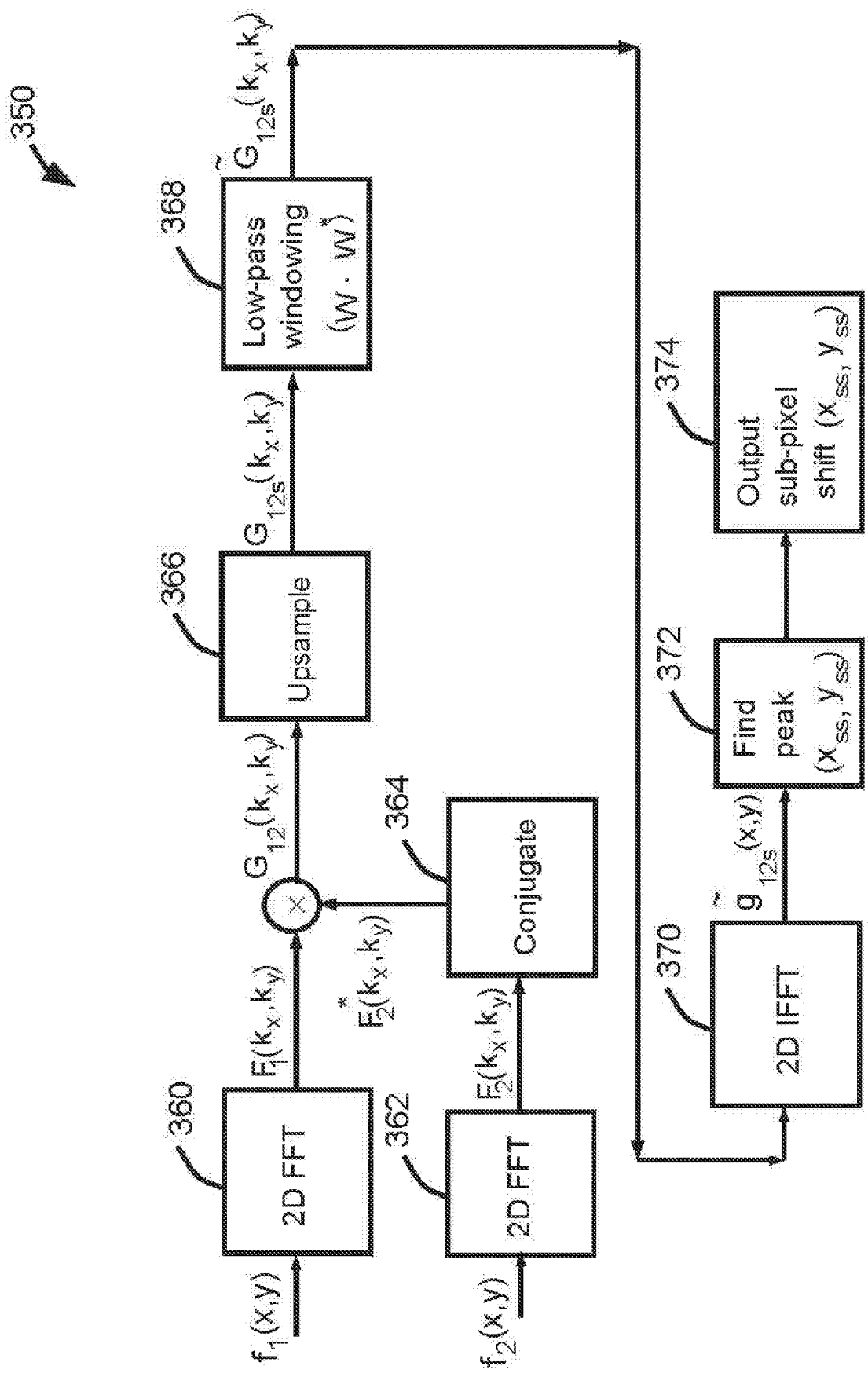
FIG. 4 is a schematic representation of a sequence of computations and/or stages of the computational efficient sub-pixel translation estimation algorithm for two-dimensional images.

Because the low-resolution input images contain aliasing, a low-pass filter is applied to the input images first. A schematic diagram of the computational efficient sub-pixel translation estimation method as described in U.S. patent application Ser. No. 11/038,401, "Method of Super-Resolving Images," filed Jan. 19, 2005, S. S. Young is illustrated in FIG. 4.

Theory of Translation and Rotation Estimation

The sub-pixel translation and rotational estimation (Box 120) is described in the following. Assuming the second image is a shifted and rotated version of the first image, i.e., $$f_2(u, v) = f_1(x, y) \quad \text{Equation (1)}$$

$$\begin{bmatrix} u \\ v \end{bmatrix} = \begin{bmatrix} \cos\theta & \sin\theta \\ -\sin\theta & \cos\theta \end{bmatrix}\begin{bmatrix} x \\ y \end{bmatrix} + \begin{bmatrix} u_s \\ v_s \end{bmatrix} \quad \text{Equation (3)}$$

where $\theta$ is the relative rotation and $(u_s, v_s)$ the relative shifts between $f_1(x,y)$ and $f_2(u,v)$.

From the shift property of Fourier transform of these images, the following relation is derived:

$$F_2(k_u,k_v) = F_1(k_x,k_y) \cdot \exp[-j(k_u u_s + k_v v_s)] \quad \text{Equation (9)}$$

where $F_2(k_u,k_v)$ and $F_1(k_x,k_y)$ are the Fourier transforms of the two images, and the $(k_u,k_v)$ domain is the rotated version of the $(k_x,k_y)$ domain; that is, $$\begin{bmatrix} k_u \\ k_v \end{bmatrix} = \begin{bmatrix} \cos\theta & \sin\theta \\ -\sin\theta & \cos\theta \end{bmatrix}\begin{bmatrix} k_x \\ k_y \end{bmatrix} \quad \text{Equation (15)}$$

Figure 5:
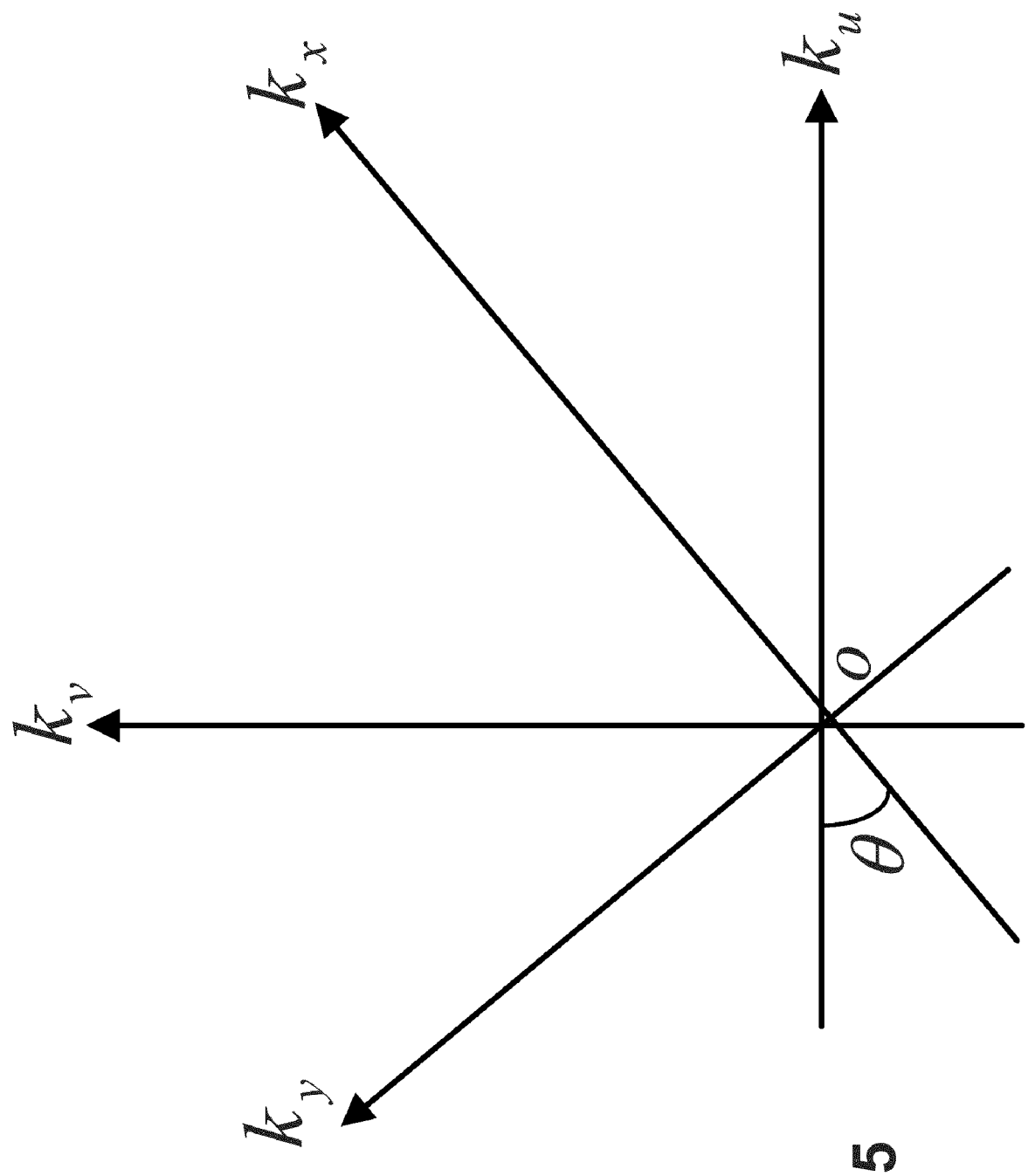
FIG. 5 is a graphic view showing the relationship between two coordinate planes, $(k_u,k_v)$ and $(k_x,k_y)$ in the spatial frequency domain in which the corresponding two origins coincide at o.

FIG. 5 shows the transformation of the two coordinates, $(k_u, k_v)$ and $(k_x,k_y)$, in the spatial frequency domain in which the corresponding two origins coincide.

Then from the polar transformation, the rotation and shift properties of Fourier transform as described previously, the polar function mappings (see operation in Equation 12) of the 2-D Fourier transforms of the two images are related by $$F_{p2}(\phi,\rho) = F_{p1}(\phi-\theta,\rho) \cdot \exp[-j(k_u u_s + k_v v_s)] \quad \text{Equation (19)}$$

Thus, for their magnitudes we have, $$|F_{p2}(\phi,\rho)| = |F_{p1}(\phi-\theta,\rho)| \quad \text{Equation (20)}$$

That is, if one image is a rotated and shifted version of the other image, then the magnitude of polar function mapping of one is the shifted version of the magnitude of polar function mapping of the other one in the spatial frequency domain.

Note the difference between Equation (20) and Equation (16). One image is represented as a rotated version of the other image in Equation (16), while one image is represented as a rotated and shifted version of the other image in Equation (20).

Therefore, the rotation angle difference $\theta$ is represented as a translational difference using the polar transformation and polar function mapping of Fourier transform. Using the correlation method, the rotation angle between the two images is estimated in a manner similar to the translation estimation.

The rotation estimation is described in the following in detail. Because the rotation difference is only represented in the first domain of the Fourier transform, the rotation angle θ is found as the peak of inverse of the marginal 1-D Fourier transform of the cross-correlation with respect to φ. The marginal 1-D Fourier transform is an operation of performing the one-dimensional Fourier transform of a 2-D function f (x,y) with respect to one of the variables, x or y.

The marginal 1-D Fourier transform of the cross-correlation with respect to φ between the two images is defined as:

$$Q_{P12}(k_\phi,\rho)=\Im_{p2}(k_\phi,\rho)\cdot\Im_{p1}^*(k_\phi,\rho) \quad \text{Equation (21)}$$

where $\Im_{p1}(k_\phi,\rho)$ and $\Im_{p2}(k_\phi,\rho)$ are the marginal 1-D Fourier transforms with respect to φ for the two images $|F_{p1}(\phi,\rho)|$ and $|F_{p2}(\phi,\rho)|$ (as defined in Equation 12), respectively, and $\Im_{p1}^*(k_\phi,\rho)$ is the complex conjugate of $\Im_{p1}(k_\phi,\rho)$ After the rotation angle is estimated, the second image is rotated back by the angle −θ to form the backward rotated image $f_{2\theta}(x,y)$. Then the shifts $(x_s,y_s)$ between the two images are estimated between $f_{2\theta}(x,y)$ and $f_1(x,y)$ according to the correlation method based on the Correlation Theorem and the shift property of Fourier transform as discussed previously.

Sub-Pixel Rotation and Translation Estimation

Rotation and Translation Estimation with Sub-pixel Accuracy—Similar as in the translation estimation with sub-pixel accuracy, the rotation estimation with sub-pixel accuracy is achieved by resampling via frequency domain interpolation. However, the resampling operation is only performed in the φ domain (as defined in Equation 13) since the rotation angle is the only parameter to be estimated. The subsequent sub-pixel translation estimation, $(x_s,y_s)$ between the backward rotated image $f_{2\theta}(x,y)$ and the first image $f_1(x,y)$, is achieved by resampling for both $k_x$ and $k_y$ domains via frequency domain interpolation (see FIG. 4).

Rotation with Aliasing Consideration The common center area of the two images $f_1(x,y)$ and $f_2(u,v)$ contributes most to the rotation angle estimation. A radially symmetrical window is applied to both images to emphasize the center common region between the two images. This radially symmetrical window is also designed as a low-pass filter to achieve accurate rotation estimation by filtering out the aliased high frequency components in the input images. As mentioned previously, the terminology aliased refers to the high frequency components folded into a portion of low frequency components. In general, for an aliased image, the image energy at lower frequency components is stronger than the folded high frequency components. Thus, the signal to aliasing power ratio is relatively high around $(k_x,k_y)\approx(0,0)$.

The radially symmetrical and low-pass window, W, is applied to the Fourier transforms $F_1(k_x,k_y)$ and $F_2(k_u,k_v)$ in the first step of the rotation estimation procedure, that is, $$\tilde{F}_1(k_x,k_y)=F_1(k_x,k_y)\cdot W(k_x,k_y) \quad \text{Equation (22a)}$$

$$\tilde{F}_2(k_u,k_v)=F_2(k_u,k_v)\cdot W(k_u,k_v) \quad \text{Equation (22b)}$$

Sub-Pixel Rotation and Translation Estimation Procedure

Figure 6:
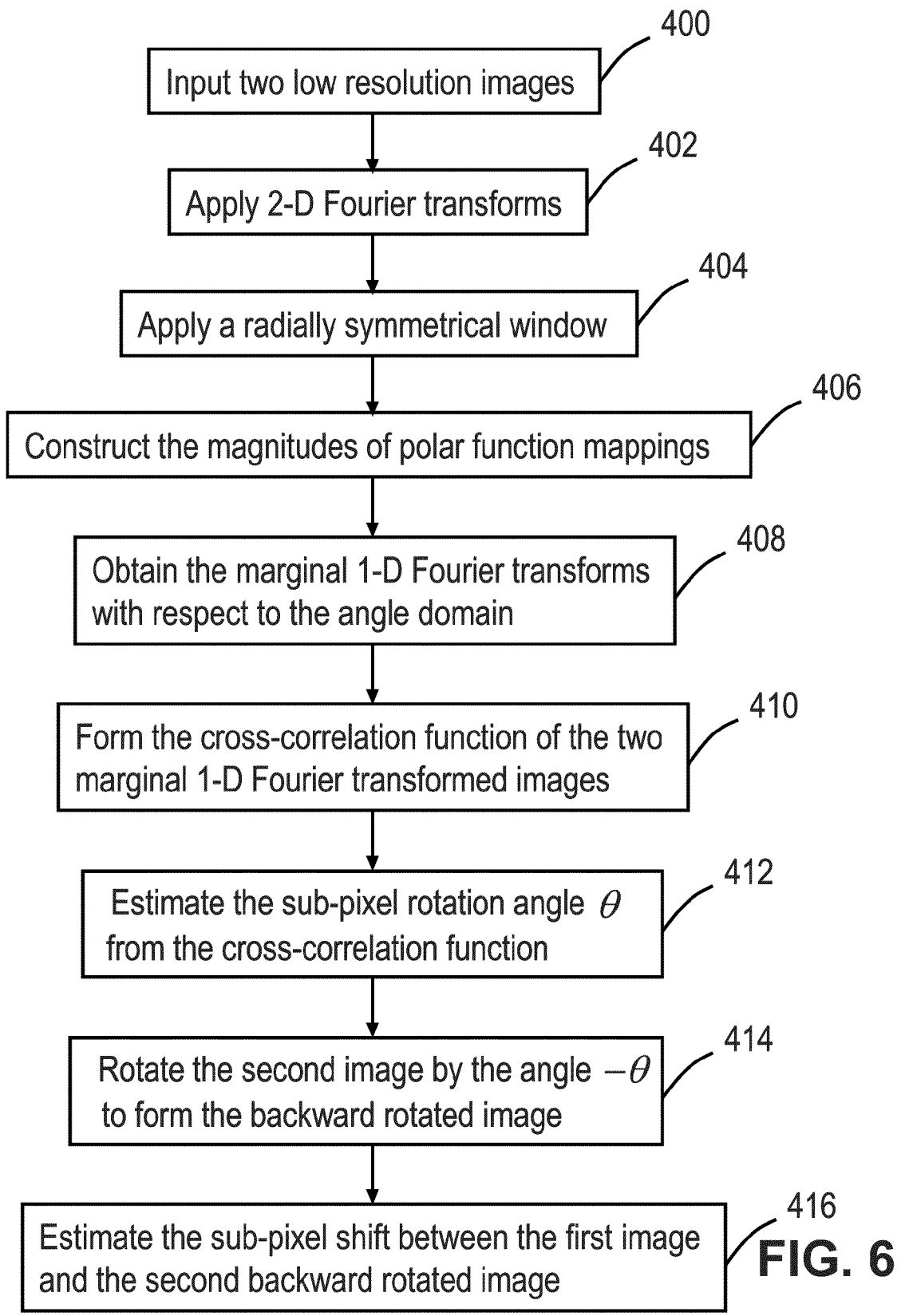
FIG. 6 is a schematic diagram of a sequence of steps representing an algorithm for estimating translation and rotation transformation parameters with sub-pixel accuracy.

A procedure to estimate translation and rotation parameters with sub-pixel accuracy between two images, $f_1(x,y)$ and $f_2(u,v)$, is summarized in the following. FIG. 6 shows a schematic representation of this estimating algorithm, which may comprise:

1) Input two low-resolution images $f_1(x,y)$ and $f_2(u,v)$ (Box 400).
2) Obtain the 2-D Fourier transforms of the two images, $F_1(k_x,k_y)$ and $F_2(k_u,k_v)$ (Box 402).
3) Apply a radially symmetrical window W to the Fourier transforms of the two images to obtain $\tilde{F}_1(k_x,k_y)$ and $\tilde{F}_2(k_u,k_v)$ (Box 404), see Equation (22a)-(22b).
4) Construct the magnitudes of the polar function mappings of the two windowed images, $|F_{P1}(\phi,\rho)|$ and $|F_{P2}(\phi,\rho)|$ (Box 406), as defined in Equation (12).
5) Obtain the marginal 1-D Fourier transforms with respect to φ for the magnitude of the two polar function mappings, $\Im_{P1}(k_\phi,\rho)$ and $\Im_{P2}(k_\phi,\rho)$ (Box 408).
6) Form the cross-correlation function of the two images, $\Im_{P1}(k_\phi,\rho)$ and $\Im_{P2}(k_\phi,\rho)$, to obtain $Q_{P12}(k_\phi,\rho)$ (Box 410), see Equation (21).
7) Estimate the rotation angle θ between two images $f_1(x,y)$ and $f_2(u,v)$ with sub-pixel accuracy from the cross-correlation function $Q_{P12}(k_\phi,\rho)$ (Box 412).
8) Rotate the second image by the angle −θ to form the backward rotated image $f_{2\theta}(x,y)$ (Box 414).
9) Estimate the relative shift between $f_{2\theta}(x,y)$ and $f_1(x,y)$ with sub-pixel accuracy to obtain the relative shifts $(x_s,y_s)$ (Box 416).

Example of Sub-Pixel Rotation and Translation

An illustration of translation and rotation estimation with sub-pixel accuracy is shown in FIGS. 7a, 7b, 8, and 9. In this example, we use a high-resolution forward looking infrared (FLIR) image to simulate a sequence of low-resolution under-sampled images with translations and rotations.

Figure 7A:
FIG. 7a shows an original FLIR tank image.
Figure 7B:
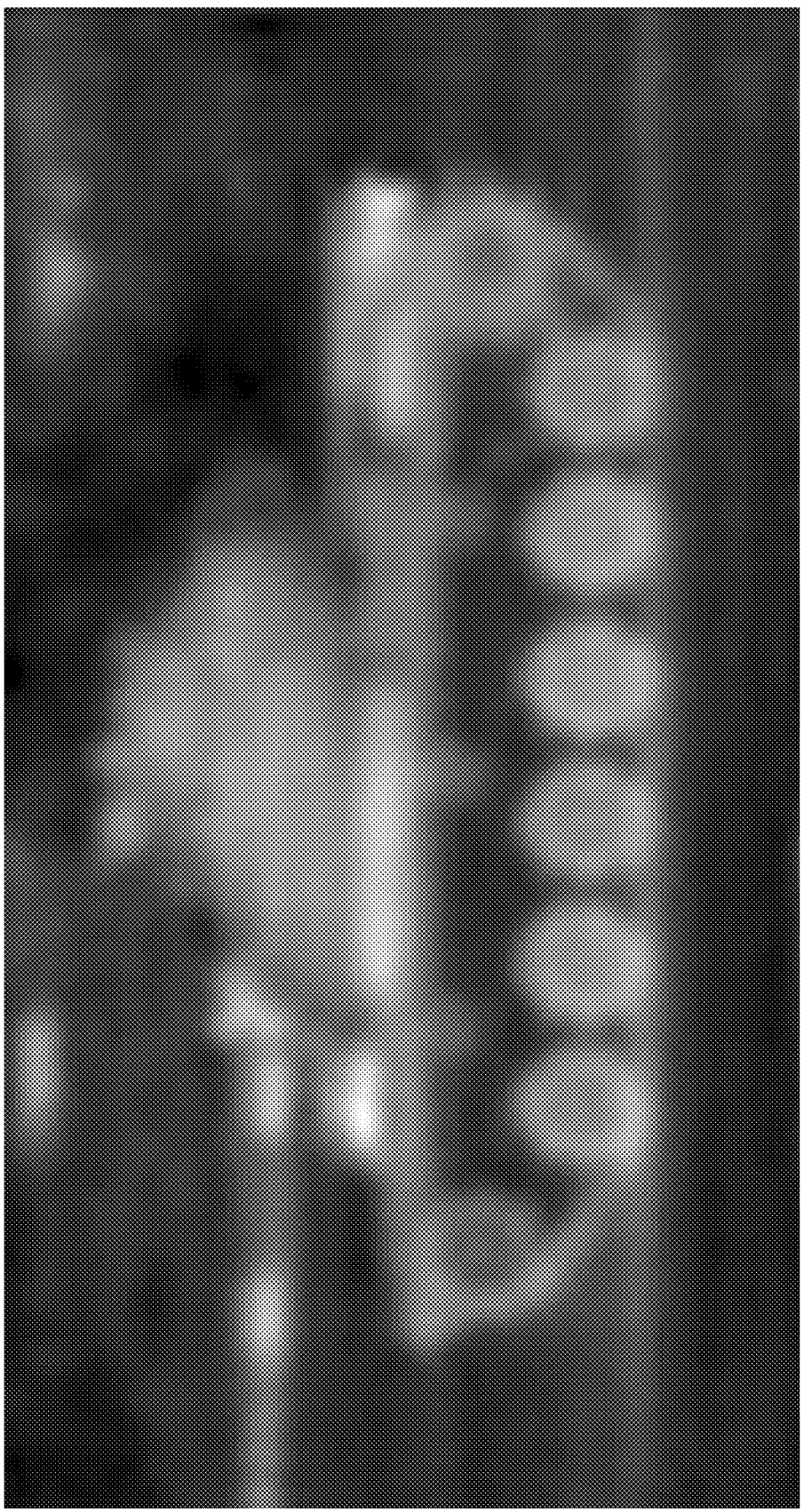
FIG. 7b shows the simulated high-resolution image from which the low-resolution images are generated.
Figure 8:
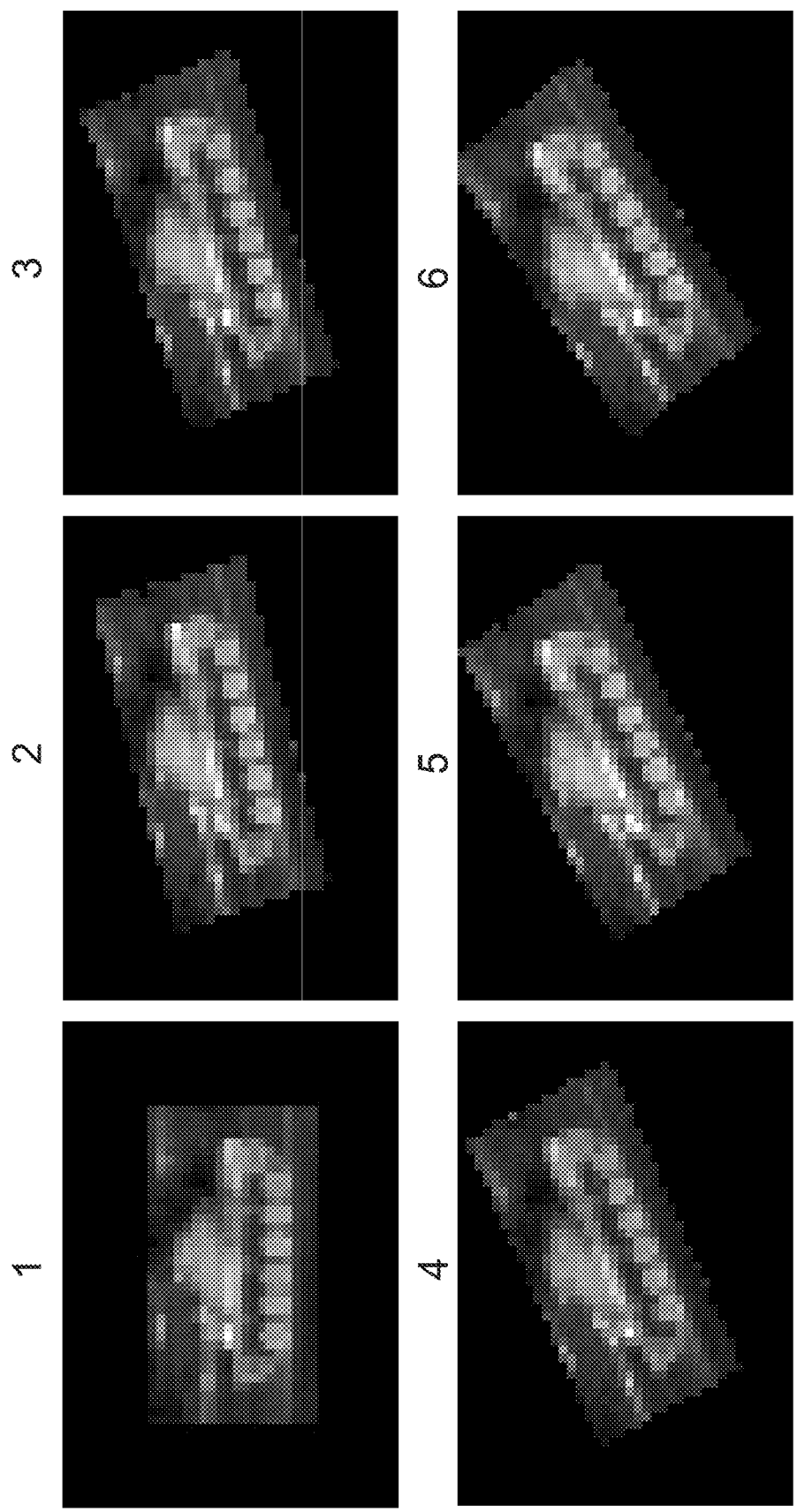
FIG. 8 shows six simulated low-resolution images with shifts and rotations among them.

An original FLIR tank image is shown in FIG. 7a. The size of this image is 40×76. First, we up-sample this image using the Fourier windowing method by a factor of 30 to obtain a simulated high-resolution image with a size of 1200×2280 as shown in FIG. 7b. Then the low-resolution images are generated from this simulated high-resolution image by sub-sampling and rotating. The randomly selected translation and rotation parameters for six of each low-resolution image are listed as follows:

$x_s$=[0 3.1 7.7 12.3 14.1 17.3];

$y_s$=[0 2.3 8.5 11.2 15.2 16.8];

θ=[0 14.4 15.6 17.8 19.1 22.7];

The units of $x_s$ and $y_s$ are pixels and the unit of θ is degrees. FIG. 8 shows six simulated low-resolution images with shifts and rotates among them.

Figure 9:
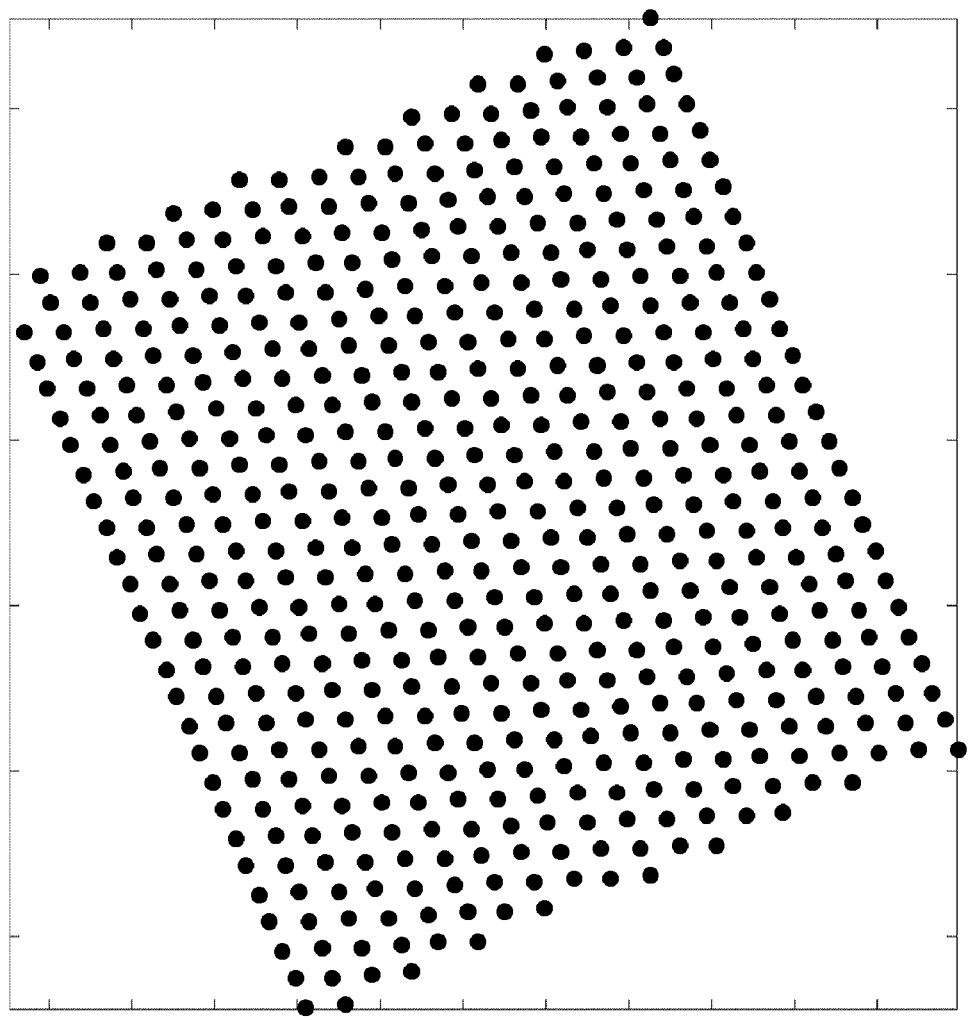
FIG. 9 is a graphic view depicting the transformation of the plane of one image (image 6 in FIG. 8) into the target domain of the reference image (image 1 in FIG. 8)

After applying the correlation method for sub-pixel shift and rotation estimation to these 6 simulated low-resolution images, the sub-pixel shift and rotation values are obtained. The estimated sub-pixel shift and rotation values are all correct according to the actual values. FIG. 9 shows the transformation of the plane of one image (image 6) into the target domain of the reference image (image 1).

Error Reduction Algorithm

Error-Energy Reduction Algorithm for Translated and Rotated Input Images—An error-energy reduction algorithm for translated and rotated images is derived to reconstruct the high-resolution alias-free output image. A primary feature of this proposed error-energy reduction algorithm for translated and rotated images is that we treat the spatial samples from low-resolution images that possess unknown and irregular (uncontrolled) sub-pixel shifts and rotations as a set of constraints to populate an over-sampled (sampled above the desired output bandwidth) processing array. The estimated sub-pixel shifted and rotated locations of these samples and their values constitute a spatial domain constraint. Furthermore, the bandwidth of the alias-free image (or the sensor imposed bandwidth) is the criterion used as a spatial frequency domain constraint on the over-sampled processing array.

In an error-energy reduction algorithm, the high-resolution image is reconstructed by removing aliasing from low resolution images. The high-resolution image is reconstructed by applying non-uniform interpolation using the constraints both in the spatial and spatial frequency domains. The algorithm is based on the concept that the error-energy is reduced by imposing both spatial and spatial frequency domain constraints: the samples from the low-resolution images; and the bandwidth of the high-resolution, alias-free output image.

In accordance with the error-energy reduction algorithm of the present invention, spatial samples from low resolution images that possess unknown and irregular (uncontrolled) sub-pixel shifts and rotations are treated as a set of constraints to populate an over-sampled (sampled above the desired output bandwidth) processing array. The estimated sub-pixel locations of these samples and their values constitute a spatial domain constraint. Furthermore, the bandwidth of the alias-free image (or the sensor imposed bandwidth) is the criterion used as a spatial frequency domain constraint on the over-sampled processing array. One may also incorporate other spatial or spatial frequency domain constraints that have been used by others; e.g., positivity of the image in the spatial domain.

Figure 10A:
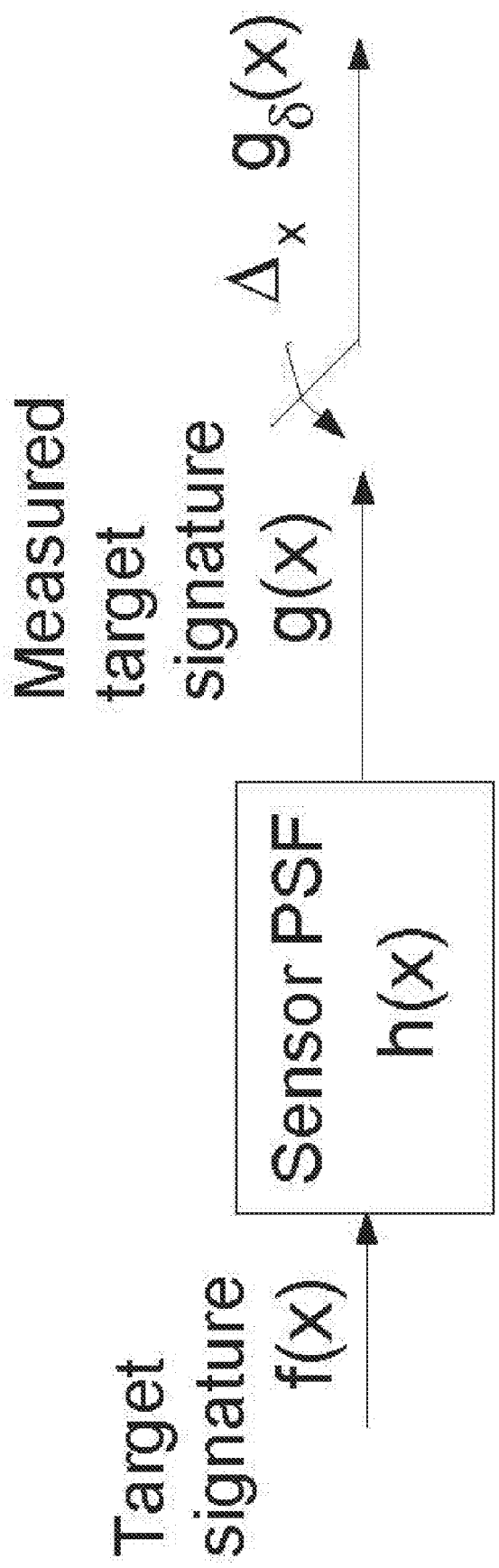
FIG. 10a is a graphic view showing an image acquisition model.

Image acquisition model—FIG. 10a shows the system model for acquiring an undersampled image in a one-dimensional case. Let f(x) be the ideal target signature that is interrogated by the sensor. The measured target signature g(x) by the sensor is modeled as the output of a Linear Shift Invariant (LSI) system whose impulse response is the sensor's point spread function (PSF), h(x); this is also known as the sensor blurring function. The relationship between the measured target signature and the original target signature in the spatial frequency $k_x$ domain is:

$$G(k_x) = F(k_x) H(k_x)$$

where $G(k_x)$, $F(k_x)$, and $H(k_x)$ are the Fourier transforms of g(x), f(x), and h(x), respectively.

Figure 10B:
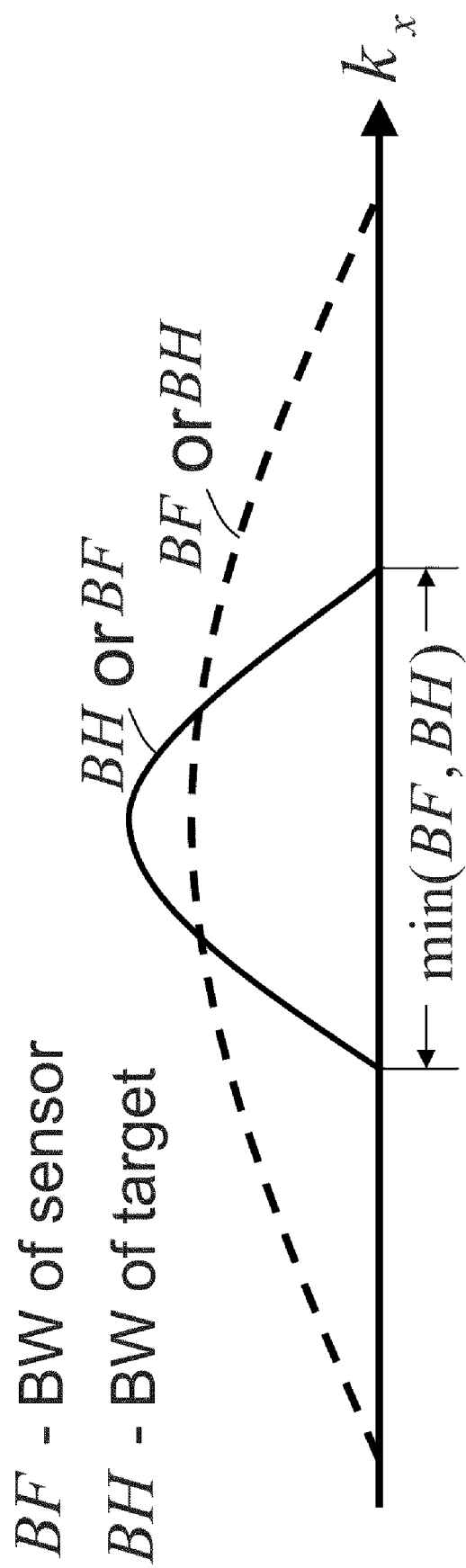
FIG. 10b is a graphic view showing factors that dictate the bandwidth of the measured target signature.

FIG. 10b shows the factors that dictate the bandwidth of the measured target signature. The bandwidth of the sensor's PSF (point spread function) is fixed and is determined by the support of the transfer function $H(k_x)$. The bandwidth of the ideal target signature depends on, e.g., the range of the target in FLIR (Forward-Looking Infrared), radar, sonar, visible light, etc. For a target at the short range, more details of the target are observable; in this case, the ideal target signature bandwidth is relatively large. For a target at the long range, the ideal target signature bandwidth is smaller. Two lines (one dotted and one solid) in FIG. 10b illustrate the bandwidths of the sensor and the ideal target signature. The wider (dotted) one could be the bandwidth of the target or the sensor, or visa-versa. The output bandwidth of the measured target signature is the minimum bandwidth of the ideal target signature and the sensor, that is, $$B_o = \min(B_t, B_s)$$

where $B_o$, $B_t$, and $B_s$ are the bandwidths of the output target signature, the ideal target signature and the sensor PSF, respectively. The proposed super-resolution image reconstruction algorithm cannot produce an image whose bandwidth exceeds $B_o$, because the de-aliasing approach cannot recover the bandwidth beyond the sensor's diffraction limit.

Assuming the measurement system stores the incoming images at the sample spacing of $\Delta_x$, the measured target signature, g(x), is then sampled at the integer multiples of $\Delta_x$, e.g., $x_n = n\Delta_x$, $n = 0, \pm 1, \pm 2, \ldots, \pm N$, to obtain the undersampled (aliased) image; the resultant can be modeled as the following delta-sampled signal in the spatial domain (see FIG. 10a);

$$g_\delta(x) = \sum_{n=-N}^{N} g(x)\delta(x - x_n) = g(x) \sum_{n=-N}^{N} \delta(x - x_n).$$

The Fourier transform of the above delta-sampled signal is $$G_\delta(k_x) = \frac{1}{\Delta_x} \sum_{l=-N}^{N} G\left(k_x - \frac{2\pi l}{\Delta_x}\right).$$

An acquired image is aliased when $$\Delta_x > \frac{2\pi}{B_o} \text{(Nyquist sample spacing)}.$$

As mentioned previously, many low resolution sensors possess a spatial sample spacing $\Delta_x$ that violate the Nyquist rate. The emphasis of the super-resolution image reconstruction algorithm in a preferred embodiment is to de-alias a sequence of undersampled aliased images to obtain the alias-free or a super-resolved image. Again it should be emphasized that the resolution of the output alias-free image is limited by the minimum bandwidth of the sensor and the ideal target signature.

One of the considerations in super-resolution image reconstruction is the number of the undersampled images that are required to recover the alias-free image. Assuming the sampling space of the original undersampled images to be $\Delta_x$. From an information-theory point of view, the sampling space of the output high-resolution image that is reconstructed from k frames (with distinct sub-pixel shifts) is $$\frac{\Delta_x}{k}$$

in one-dimensional imaging systems, and $$\left(\frac{\Delta_x}{\sqrt{k}}, \frac{\Delta_y}{\sqrt{k}}\right)$$

in two-dimensional imaging systems.

A numerical example is given in the following. An image array of 100×100 is initially acquired to represent a scene. The total number of pixels is 10,000. If the resolution of the image is desired to be 4 times in each direction, the image array of 400×400 is required. The total number of pixels for the high-resolution image is 160,000. That means that it requires 16 low-resolution images to achieve the resolution improvement factor of 4. Therefore, the number of input low-resolution image frames is the square of the resolution improvement factor. In other words, the resolution improvement factor is the square root of the number of the input images.

Theoretically, more frames should provide more information and, thus, larger bandwidth and/or higher resolution. However, the super-resolution image quality does not improve when the number of processed undersampled images exceeds a certain value. This is due to the fact that the bandwidth recovery is limited by the minimum of the bandwidths of the sensor or ideal target signature.

Figure 11:
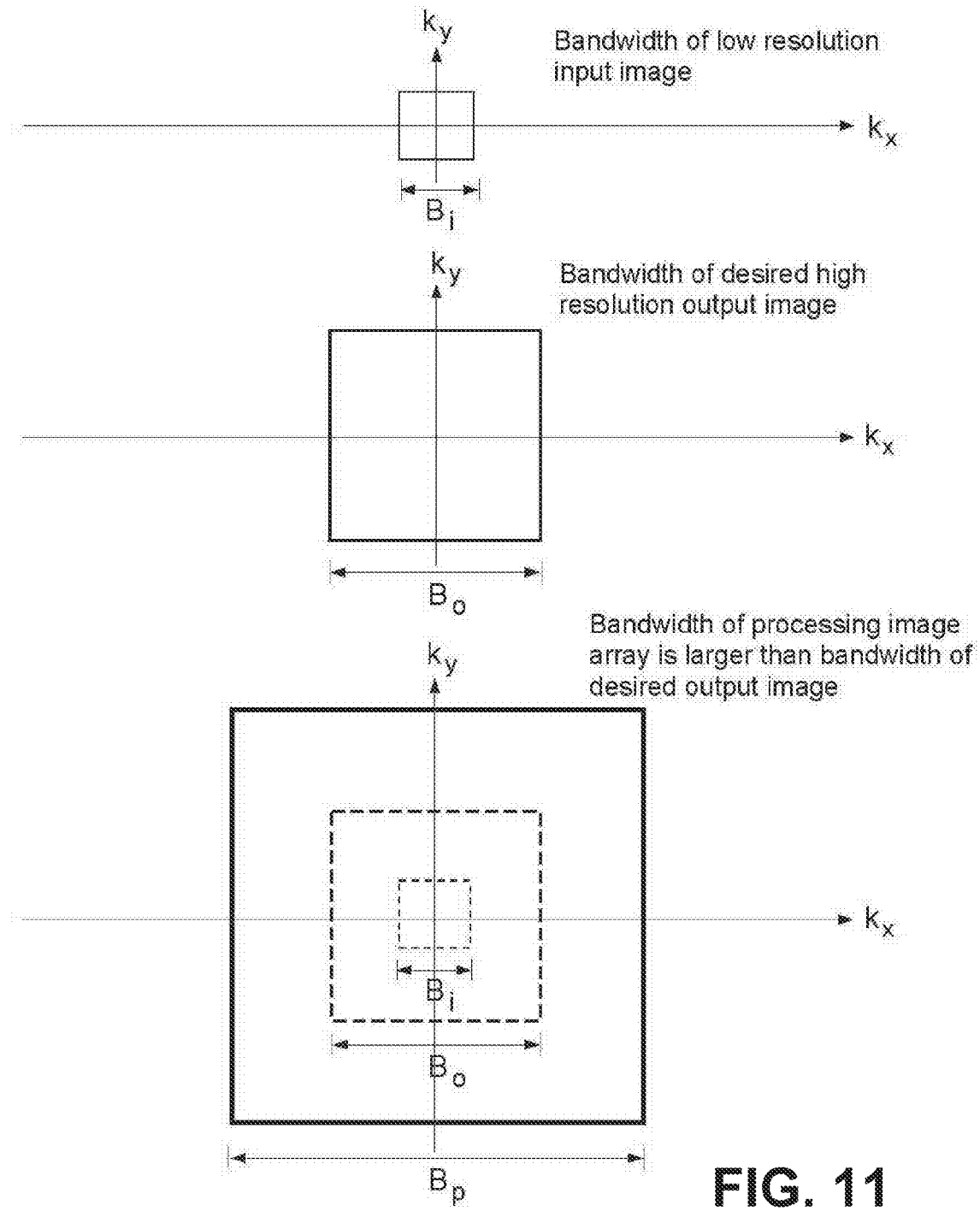
FIG. 11 is a graphic view depicting the bandwidth phenomenon in the super-resolution image reconstruction algorithm.

Implementation of Error-Energy Reduction Algorithm The bandwidth of the input undersampled (aliased) images is designated $B_i$. The bandwidth of the alias-free (high-resolution) output image is denoted as $B_o$. In order to recover the desired (alias-free) bandwidth, it is important to select a processing array with a sample spacing smaller than the sample spacing of the desired high-resolution image. In this case, the 2D FFT of the processing array yields a spectral coverage $B_p$ that is larger than the bandwidth of the output image. FIG. 11 illustrates this phenomenon in the 2D spatial frequency domain.

The high-resolution alias-free image on the processing array (grid) is designated as p(x,y). The low-resolution (aliased) snap-shots only provide a sub-set of samples of this image. The location of each aliased image on the processing grid is dictated by its corresponding sub-pixel shifts and rotations in the (x,y) domain.

In the following, the error-energy reduction algorithm is described for the input images containing both translational shifts and rotational differences. FIG. 12 shows a schematic representation of the error-energy reduction algorithm for input image sequences transformed by both translations and rotations.

Inputs to the error energy reduction algorithm are a sequence of low-resolution input images and the estimated sub-pixel shifts and rotations of each image with respect to the reference image; usually the first image is chosen as the reference image. Denote $f_l(u_i,v_j)$ to be L images from the input image sequence, where l=1, 2, . . . , L, i=1, 2, . . . , I, j=1, 2, . . . , J; I×J is the dimension of the input image. After the transformation parameters ($\hat{\theta}_l, \tilde{x}_{sl}, \tilde{y}_{sl}$) are estimated for all L images, the transform coordinates are calculated from the estimated sub-pixel shifts and rotation angles as follows:

$$\begin{bmatrix} \hat{x}_{ijl} \\ \hat{y}_{ijl} \end{bmatrix} = \begin{bmatrix} \cos\hat{\theta}_l & \sin\hat{\theta}_l \\ -\sin\hat{\theta}_l & \cos\hat{\theta}_l \end{bmatrix} \begin{bmatrix} u_i \\ v_j \end{bmatrix} + \begin{bmatrix} \hat{x}_{sl} \\ \hat{y}_{sl} \end{bmatrix}$$

In the initializing step (Box 500), the processing array is initialized by populating the grids using the input images according to the estimates of the sub-pixel shifts and rotation angles. A processing array is selected with a sample spacing that is smaller than the sample spacing of the desired high-resolution image.

In this procedure, the available image values (from multiple snapshots) are assigned to each sub-pixel shifted and rotated grid location of the processing array. At the other grid locations of the processing array, zero values are assigned. This can be written as $$p_1(X_m, Y_n) = \begin{cases} f_l(\hat{x}_{ijl}, \hat{y}_{ijl}) \\ 0 \end{cases}$$

where $(X_m, Y_n)$ is the grid location that is closest to the transform coordinates [$\tilde{x}_{ijl}, \tilde{y}_{ijl}$], and m=1, 2, . . . , M, n=1, 2, . . . , N; M×N is the dimension of the processing grid.

In Box 502, a 2-D Fourier transform $P_1(k_x,k_y)$ is preformed on the processing array. Its spectrum has a wider bandwidth than the true (desired) output bandwidth. Therefore, the spatial frequency domain constraint (Box 504) is applied, that is, replacing zeros outside the desired bandwidth. The function $$P_2(k_x,k_y) = P_1(k_x,k_y) \cdot W_p(k_x,k_y)$$

is formed where $W_p(k_x,k_y)$ is a windowing function of realizing the spatial frequency domain constraint. In Box 506, the inverse 2-D Fourier transform $p_2(x,y)$ of the resultant array $P_2(k_x,k_y)$ is performed.

The resultant inverse array is not a true image because the image values at the known grid locations are not equal to the original image values. Then the spatial domain constraint is applied (Box 508), that is, replacing those image values at the known grid locations with the known original image values.

In this step of applying spatial domain constraints using shifts and rotations (Box 508), we have the function $$p_{k+1}(X_m, Y_n) = \begin{cases} f_l(\hat{x}_{ijl}, \hat{y}_{ijl}) \\ p_k(X_m, Y_n) \end{cases}$$

to form the current iteration output image $p_{k+1}(X_m,Y_n)$ from the previous iteration output image $p_k(X_m,Y_n)$. That is, the known grid locations are replaced with the known original image values and other grid locations are kept as the previous iteration output image values.

Similarly, the use of the available information in the spatial and spatial frequency domains results in a reduction of the energy of the error at each iteration step. At the odd steps of the iteration, the error is defined by $$e_{2k+1} = \sum_{(m,n)} [p_{2k+1}(X_m, Y_n) - p_{2k-1}(X_m, Y_n)]^2$$

In Box 510, the condition of the error-energy reduction is examined by defining the following ratio:

$$SNR_{2k+1} = 10 \log_{10}\left(\frac{\sum_{(m,n)}[p_{2k+1}(X_m, Y_n)]^2}{\sum_{(m,n)}[p_{2k+1}(X_m, Y_n) - p_{2k-1}(X_m, Y_n)]^2}\right)$$

If $SNR_{2k+1} < SNR_{max}$ (where $SNR_{max}$ is a pre-assigned threshold value), and the maximum iteration is not reached (Box 512), the iteration continues. If $SNR_{2k+1} > SNR_{max}$, that is, the stopping criterion is satisfied, the iteration is terminated. Before the final super-resolution image is generated, the bandwidth of the output image is reduced (Box 514) from $B_p$ to $B_o$ using the Fourier windowing method (see S. S. Young 2004). Then the final super-resolved image with a desired bandwidth is saved for the output (Box 516).

Example

An illustration of super-resolving images from low-resolution sequences transformed by translations and rotations is shown in FIG. 13. The 6 input low-resolution images that are transformed by translations and rotations are shown in FIG. 8. The estimated sub-pixel shift and rotation values are all correct according to the actual values as described previously. The reconstructed image from these 6 input low-resolution images using the error-energy reduction algorithm is shown in FIG. 13b. For the comparison purpose, one of the low-resolution input images is displayed in FIG. 13a. By observing FIG. 13b, it can be seen that the super-resolved image shows a significant improvement from the low-resolution image by exhibiting the detailed information especially in the wheel, turret, and barrel areas. This illustrates that the super-resolved image is obtained even under the condition that the low-resolution input images contain both shifts and rotations among them.

Figure 14:
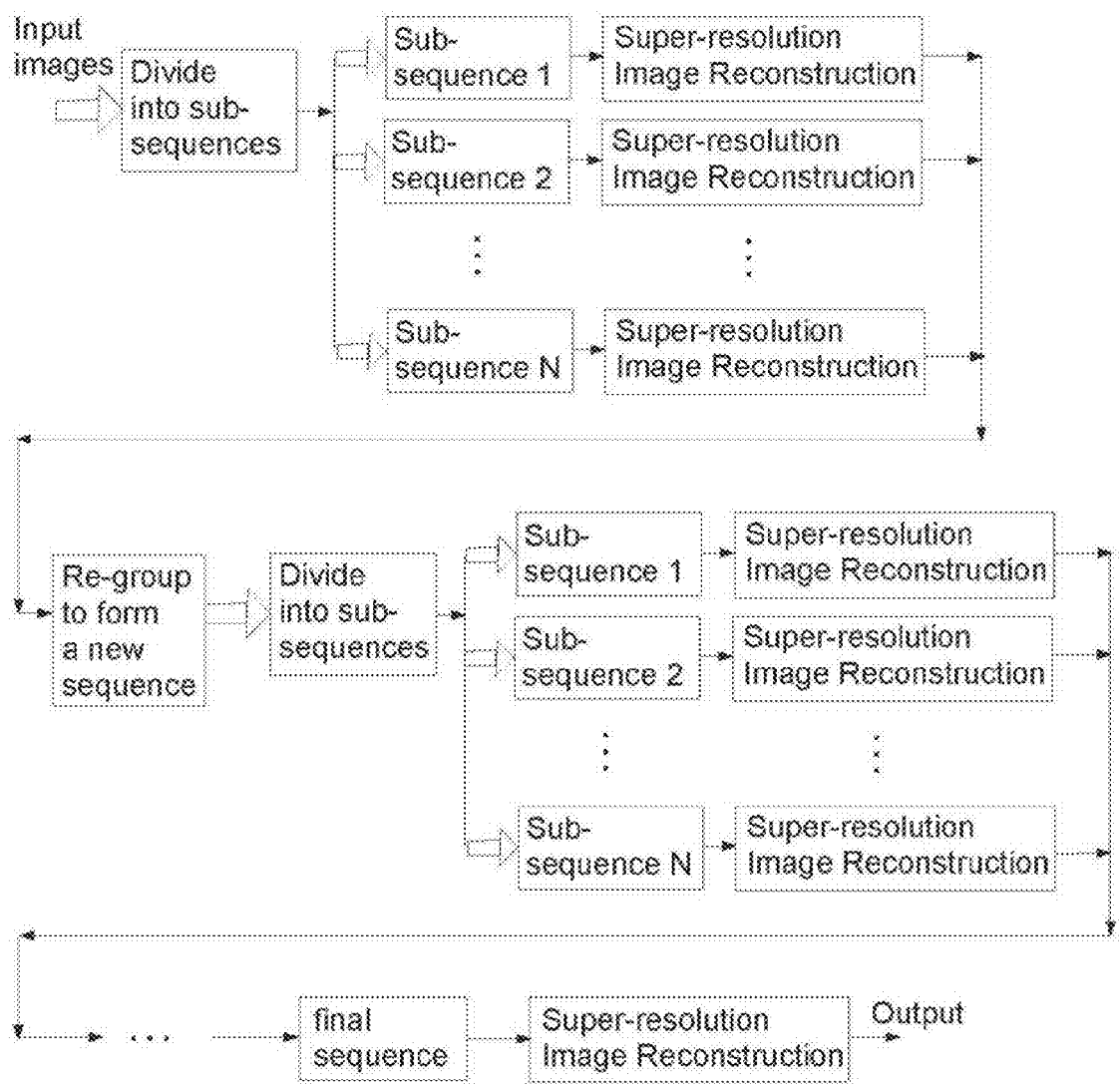
FIG. 14 is a schematic representation of an alternative embodiment of the super-resolution image reconstruction algorithm that is implemented in a sequential manner.

In the present invention, the super-resolution image reconstruction can also be implemented in a sequential manner as shown an alternative embodiment in FIG. 14.

The input images are divided into sub-sequences first. Each sub-sequence passes through the super-resolution image reconstruction algorithm to generate one output image. The images that are generated from all sub-sequences are then re-grouped to form a new sequence. Obviously, the number of images of this new sequence is less than the number of original input images. This new sequence is again divided into sub-sequences.

This procedure repeats until a final output image reaches the desired resolution.

Figure 15:
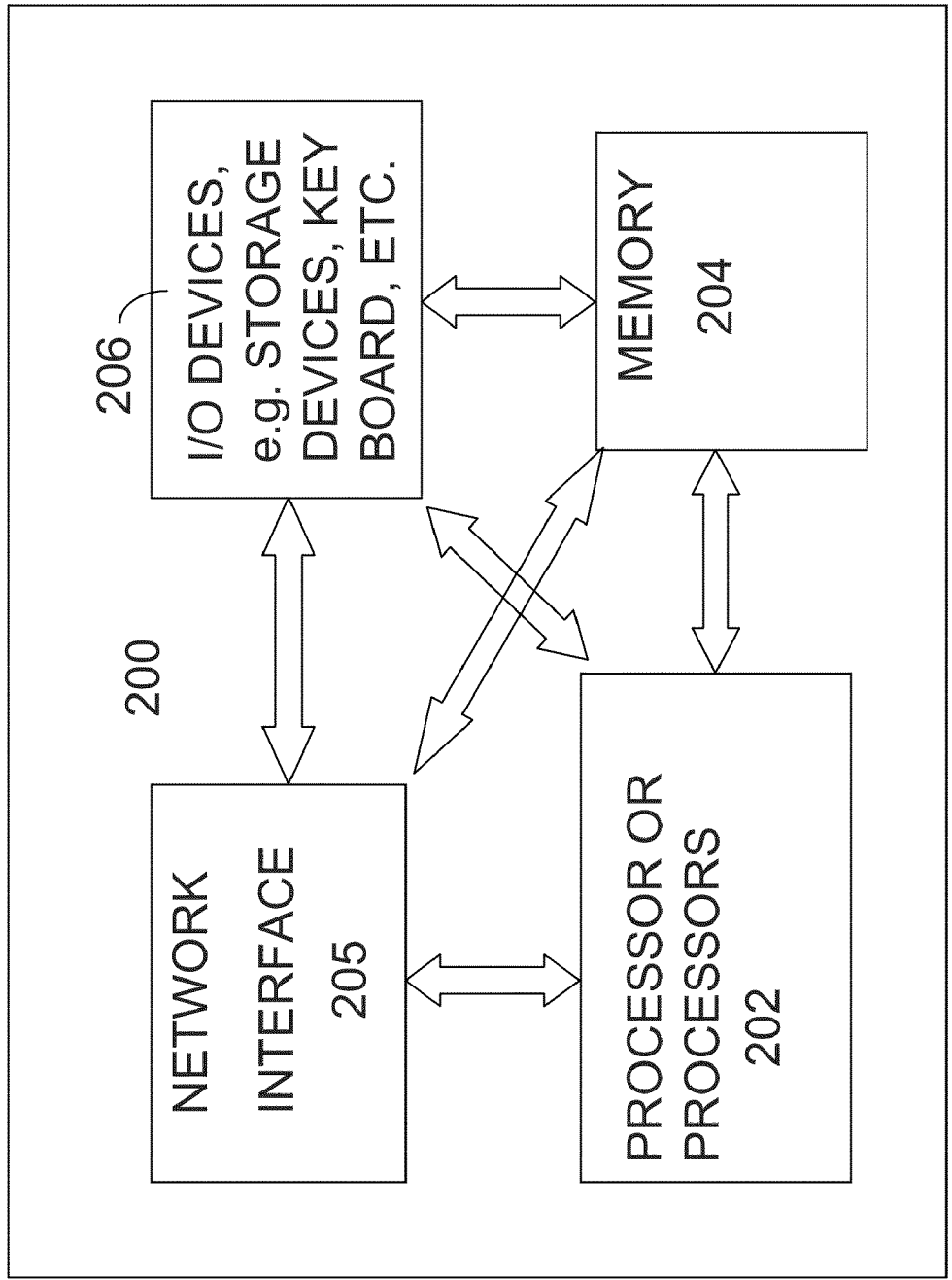
FIG. 15 depicts a high level block diagram of a general purpose computer.

FIG. 15 depicts a high level block diagram of a general purpose computer suitable for use in performing the functions described herein, including the steps shown in the block diagrams, schematic representations, and/or flowcharts. As depicted in FIG. 15, the system 200 includes a processor element 202 (e.g., a CPU) for controlling the overall function of the system 200. Processor 202 operates in accordance with stored computer program code, which is stored in memory 204. Memory 204 represents any type of computer readable medium and may include, for example, RAM, ROM, optical disk, magnetic disk, or a combination of these media. The processor 202 executes the computer program code in memory 204 in order to control the functioning of the system 200. Processor 202 is also connected to network interface 205, which transmits and receives network data packets. Also included are various input/output devices 206 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like).

Although various preferred embodiments of the present invention have been described herein in detail to provide for complete and clear disclosure, it will be appreciated by those skilled in the art, that variations may be made thereto without departing from the spirit of the invention.

The terminology "transformation" as used herein (exclusive of the Fourier transform) refers to changes induced by movement of the image capture device, including translation and rotation.

The terminology marginal 1-D Fourier transform as used herein is the 1-D Fourier transform of a 2-D function f (x,y) with respect to one of the variables, x or y.

The terminology "processor" or "image processor" as used in the following claims includes a computer, multiprocessor, CPU, minicomputer, microprocessor or any machine similar to a computer or processor which is capable of processing algorithms.

The terminology "operations" as used in the following claims includes steps, a series of operations, actions, processes, subprocesses, acts, functions, and/or subroutines.

The terminology "cross-correlation" or "cross correlation" as used herein is a measure of similarity of two frames in terms of a function of one of them.

It should be emphasized that the above-described embodiments are merely possible examples of implementations.

Many variations and modifications may be made to the above-described embodiments. All such modifications and variations are intended to be included herein within the scope of the disclosure and protected by the following claims. The invention has been described in detail with particular reference to certain preferred embodiments thereof, but it will be understood that variations and modifications can be effected within the spirit and scope of the invention.

What is claimed is:

1. A system for super-resolving images from low-resolution sequences comprising:
    an image processor having an input for inputting multiple images of a scene with sub-pixel translations and rotations; one of the images of the scene being a reference image; and
    at least one memory comprising:
        a gross translation estimation algorithm for estimating overall translations of at least one image with respect to the reference image on the image processor and aligning the inputted images according to the gross translation estimates on the image processor;
        a sub-pixel estimation algorithm for obtaining the sub-pixel shift and rotation of each image with respect to the reference image; and
        an error reduction algorithm for applying at least one spatial frequency domain constraint and at least one spatial domain constraint to the images to produce at least one high-resolution image.

2. The system of claim 1 wherein the at least one spatial frequency domain constraint comprises the sensor imposed bandwidth.

3. The system of claim 1 wherein the operations performed by the sub-pixel estimation algorithm comprise applying 2-D Fourier transforms to the reference image and a first image; creating a radially symmetrical window to the Fourier transforms of the first and reference images to obtain windowed images; constructing the polar transforms of the windowed images to obtain two polar function mappings; creating the marginal 1-D Fourier transforms with respect to the angle domain for the magnitudes of the two polar function mappings; forming the cross-correlation function of the two marginal 1-D Fourier transformed images; estimating the sub-pixel rotation angle $\theta$ between two images from the cross-correlation function; rotating the second image by the angle $-\theta$ to form the backward rotated image; and estimating the sub-pixel shift between the first image and the second backward rotated image.

4. The system of claim 1 wherein the operations performed by the error reduction algorithm comprise:
    a) initializing a processing array by populating the grids using the input image values and sub-pixel shift and rotation estimates;
    b) applying the 2D Fourier transform to the said processing array;
    c) applying spatial frequency domain constraints to the Fourier transformed processing array to obtain the constrained spatial frequency domain processing array;
    d) applying the inverse 2D Fourier transform to the constrained spatial frequency domain processing array to obtain the inverse processing array;
    e) applying spatial domain constraints using the estimated shifts and rotations to the said inverse processing array to obtain the constrained spatial domain processing array;

f) checking the error-energy reduction condition; if the stopping criterion is not satisfied, goes back to the step of applying the 2D Fourier transform; if the stopping criterion is satisfied then
i) reducing the bandwidth from the processing array to the desired output array; and
j) outputting the super-resolved image with the desired bandwidth.

5. The system of claim 4 wherein the step of initializing a processing array comprises:
a) providing the estimated sub-pixel shift and rotation of each image with respect to a reference image;
b) calculating the transformed coordinates from the estimated sub-pixel shifts and rotation angles;
d) generating a 2D processing array with a sample spacing smaller than one of the desired high-resolution output image, that is, a 2D processing array with a larger size than the desired high-resolution output image;
d) assigning the known image values to the closest sub-pixel shifted and rotated grid location of the processing array; and
e) assigning zeros to other grid locations.

6. The system of claim 1 wherein the at least one spatial domain constraint is applied using estimated shifts and rotations by replacing image values at the closest sub-pixel shifted and rotated grid locations of the processing array with the known original low-resolution image values and keeping image values at other grid locations of the processing array.

7. A method of super-resolving images affected by movement including translation and rotation comprising:
inputting frames of low-resolution images of a scene into a processor; at least one of the frames being affected by movement;
estimating the sub-pixel shifts and rotations among the low resolution image frames due to the movement; and
applying an error reduction algorithm utilizing at least one spatial frequency domain constraint and at least one spatial domain constraint to produce a high-resolution output.

8. The method of claim 7 wherein the high resolution output is a sequence of high-resolution images that are generated from multiple sequences of low-resolution images.

9. The method of claim 7 wherein the step of applying the error reduction algorithm comprise:
a) initializing a processing array by populating the grids using the input image values and sub-pixel shift and rotation estimates;
b) applying the 2D Fourier transform to the said processing array;
c) applying spatial frequency domain constraints to the Fourier transformed processing array to obtain the constrained spatial frequency domain processing array;
d) applying the inverse 2D Fourier transform to the constrained spatial frequency domain processing array to obtain the inverse processing array;
e) applying spatial domain constraints using the estimated shifts and rotations to the said inverse processing array to obtain the constrained spatial domain processing array;
f) checking the error-energy reduction condition; if the stopping criterion is not satisfied, goes back to the step of applying the 2D Fourier transform; if the stopping criterion is satisfied then
i) reducing the bandwidth from the processing array to the desired output array; and
j) outputting the high resolution output with the desired bandwidth.

10. The method of claim 9 wherein the step of initializing a processing array comprises:
a) providing the estimated sub-pixel shift and rotation of each image with respect to a reference image;
b) calculating the transformed coordinates from the estimated sub-pixel shifts and rotation angles;
d) generating a 2D processing array with a sample spacing smaller than one of the desired high-resolution output image, that is, a 2D processing array with a larger size than the desired high-resolution output image;
d) assigning the known image values to the closest sub-pixel shifted and rotated grid location of the processing array; and
e) assigning zeros to other grid locations.

11. The method of claim 7 wherein error reduction algorithm comprises an iterative error energy reduction algorithm using the transformations of each low-resolution image in an upsampled grid to reconstruct the high-resolution output, the error-energy reduction algorithm utilizing the low resolution images and their transformations on the upsampled grid as the spatial domain constraint and the bandwidth as the spatial frequency domain constraint.

12. The method of claim 7 wherein the step of estimating the sub-pixel shifts and rotations comprises utilizing a correlation method with a shift and rotation property of a Fourier transform to estimate sub-pixel shifts and rotations among the frames of the image.

13. The method of claim 7 wherein the step of applying an error reduction algorithm comprises treating the spatial samples from low-resolution images as a set of constraints to populate an oversampled processing array which is sampled above the desired output bandwidth, whereby the estimated sub-pixel translations and rotations of the low resolution images and their values constitute a spatial domain constraint and the bandwidth of the high resolution output is the criterion used as a spatial frequency domain constraint.

14. The method of claim 7 wherein the spatial domain constraint of the error reduction algorithm is the estimated sub-pixel translations and rotations of the low resolution images and their values, and the spatial frequency domain constraint is the bandwidth.

15. The method of claim 7 wherein the step of estimating the sub-pixel shifts and rotations comprises utilizing a Fourier-based correlation method to explore the translational and rotational differences of Fourier transforms of at least two images.

16. The method of claim 7 wherein the error reduction algorithm reconstructs a high-resolution output image by applying non-uniform interpolation using the constraints both in the spatial and spatial frequency domains.

17. The method of claim 7 wherein the movement that affects the images is caused by the sensor movement as the images are being captured.

18. The method of claim 17 wherein the sensor is a camera.

19. The method of claim 7 wherein the movement that affects the images is caused by movement of at least one target.

* * * * *